(12) United States Patent
Inoue et al.

(10) Patent No.: US 9,460,502 B2
(45) Date of Patent: Oct. 4, 2016

(54) DEFECT INSPECTION APPARATUS USING IMAGES OBTAINED BY OPTICAL PATH ADJUSTED

(71) Applicant: Kabushiki Kaisha Toshiba, Tokyo (JP)

(72) Inventors: Hiromu Inoue, Yokohama (JP); Takeshi Fujiwara, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 341 days.

(21) Appl. No.: 13/798,708

(22) Filed: Mar. 13, 2013

(65) Prior Publication Data

US 2013/0242084 A1 Sep. 19, 2013

(30) Foreign Application Priority Data

Mar. 13, 2012 (JP) ................................. 2012-056468

(51) Int. Cl.
*G06T 7/00* (2006.01)

(52) U.S. Cl.
CPC ............. *G06T 7/0004* (2013.01); *G06T 7/001* (2013.01); *G06T 2207/30148* (2013.01)

(58) Field of Classification Search
CPC .................... G06T 2207/30148; G06T 7/001; G06T 7/0004
See application file for complete search history.

(56) References Cited

U.S. PATENT DOCUMENTS

| | | | |
|---|---|---|---|
| 2001/0041884 A1* | 11/2001 | Frey et al. ........................ 606/5 |
| 2005/0018996 A1* | 1/2005 | Seo et al. ...................... 385/147 |
| 2005/0110988 A1* | 5/2005 | Nishiyama et al. ........ 356/237.5 |
| 2005/0111089 A1* | 5/2005 | Baer .............................. 359/368 |
| 2006/0192975 A1* | 8/2006 | Sato et al. .................... 356/497 |
| 2007/0222977 A1* | 9/2007 | Hayashi et al. ........... 356/237.2 |
| 2012/0020546 A1 | 1/2012 | Inoue et al. |

FOREIGN PATENT DOCUMENTS

| | | | | |
|---|---|---|---|---|
| JP | 62-43129 A | 2/1987 | | |
| JP | 3-57946 | 3/1991 | | |
| JP | 05276306 A | * 10/1993 | ............... H04N 1/00 |
| JP | 5-312955 | 11/1993 | | |
| JP | 5-332739 A | 12/1993 | | |

(Continued)

OTHER PUBLICATIONS

Office Action issued Feb. 4, 2014 in Japanese Patent Application No. 2012-056468 with English language translation.

(Continued)

*Primary Examiner* — Jay Patel
*Assistant Examiner* — Joseph Suh
(74) *Attorney, Agent, or Firm* — Oblon, McClelland, Maier & Neustadt, L.L.P.

(57) ABSTRACT

A defect inspection apparatus including an illumination optical system, an image formation optical system, an image data conversion unit, a singular part detecting circuit, an optical path length adjusting mechanism, and a defect determining unit. The image formation optical system forms an optical image derived from light passing through first and second optical paths. The image data conversion unit converts, to image data, each of the optical images. The singular part detecting circuit detects a singular part in each of the image data. The optical path length adjusting mechanism equalizes the optical path lengths of the first and second optical paths. The defect determining unit determines a defect on the basis of singular part detection.

1 Claim, 19 Drawing Sheets

(56) References Cited

FOREIGN PATENT DOCUMENTS

| | | |
|---|---|---|
| JP | 2000-180377 A | 6/2000 |
| JP | 2008-302065 | 12/2008 |
| JP | 2009-174918 | 8/2009 |
| JP | 2010-160079 | 7/2010 |

OTHER PUBLICATIONS

R. A. Shaw et al. "Noise Model-Based Cosmic Ray Rejection for WF/PC Images", Astronomical Society of the Pacific, 1992, pp. 311-315.

* cited by examiner

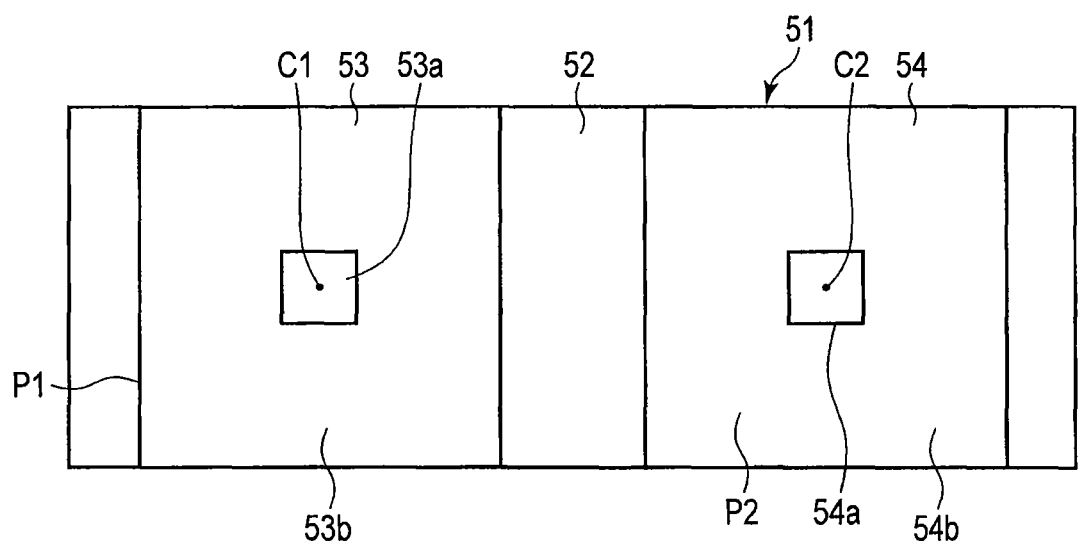
F I G. 3

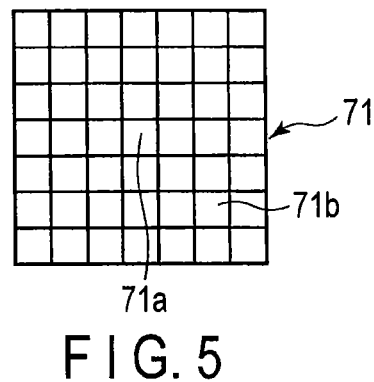
F I G. 5
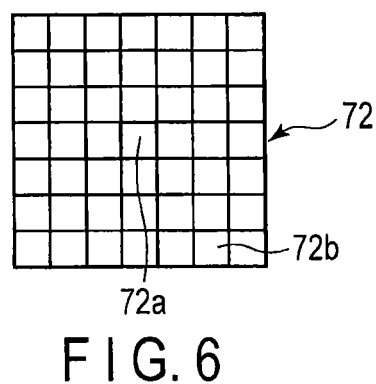
F I G. 6
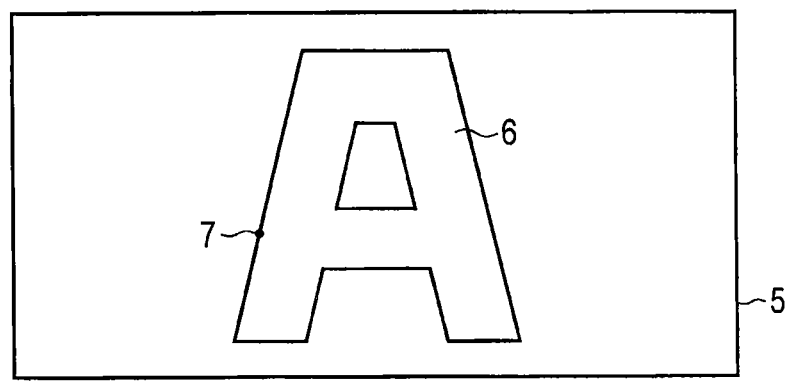
F I G. 7

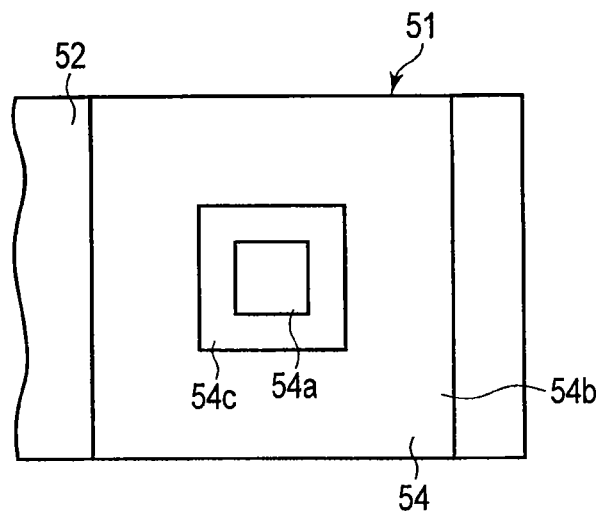
F I G. 9
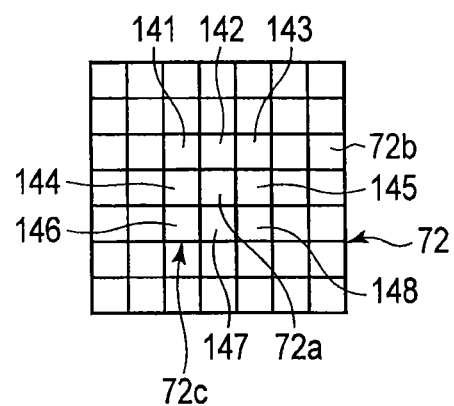
F I G. 10

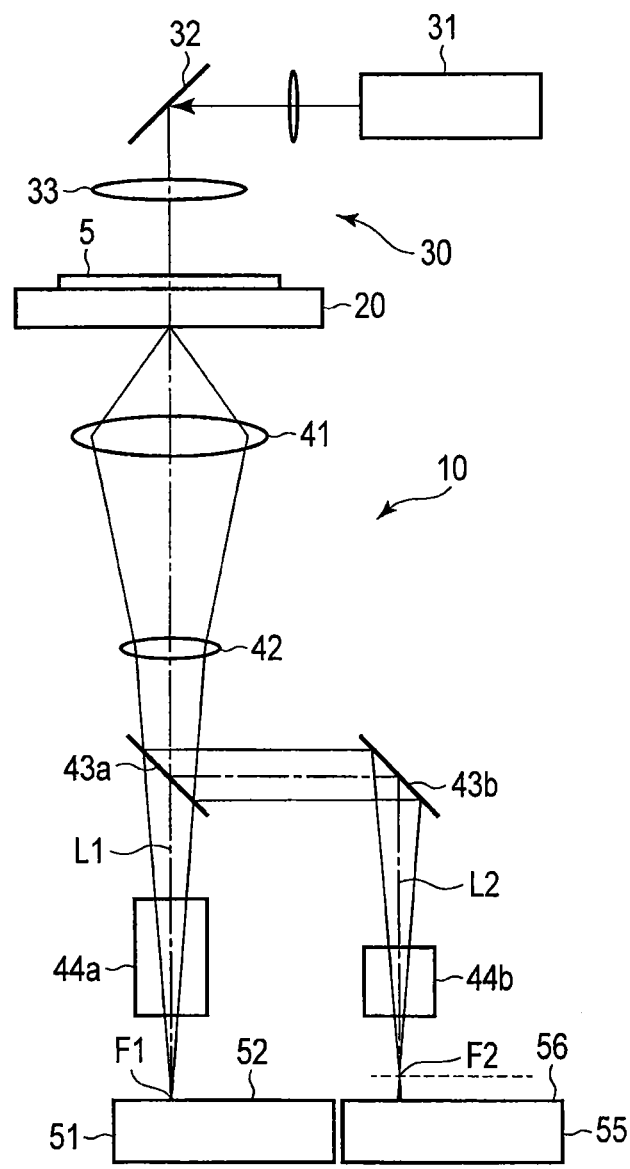
F I G. 12

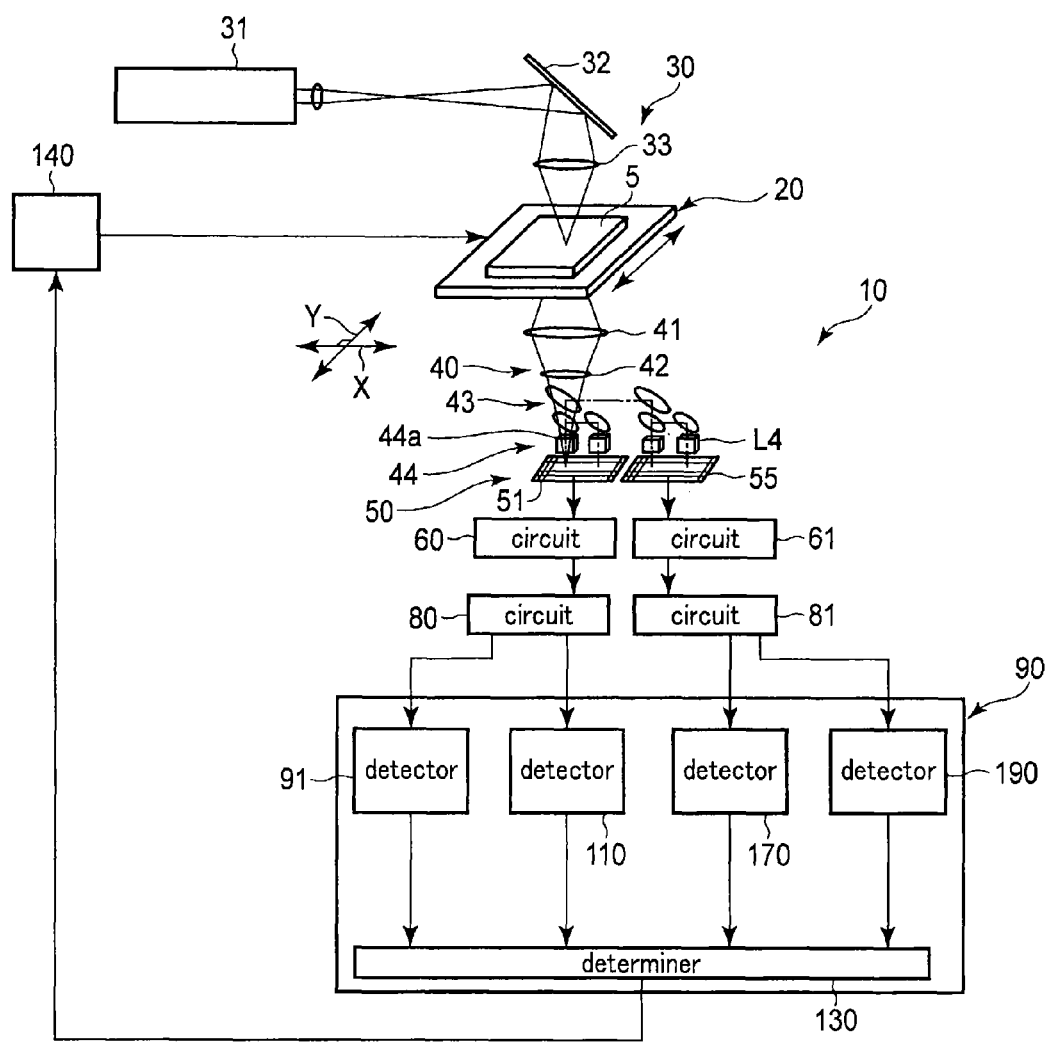
F I G. 17

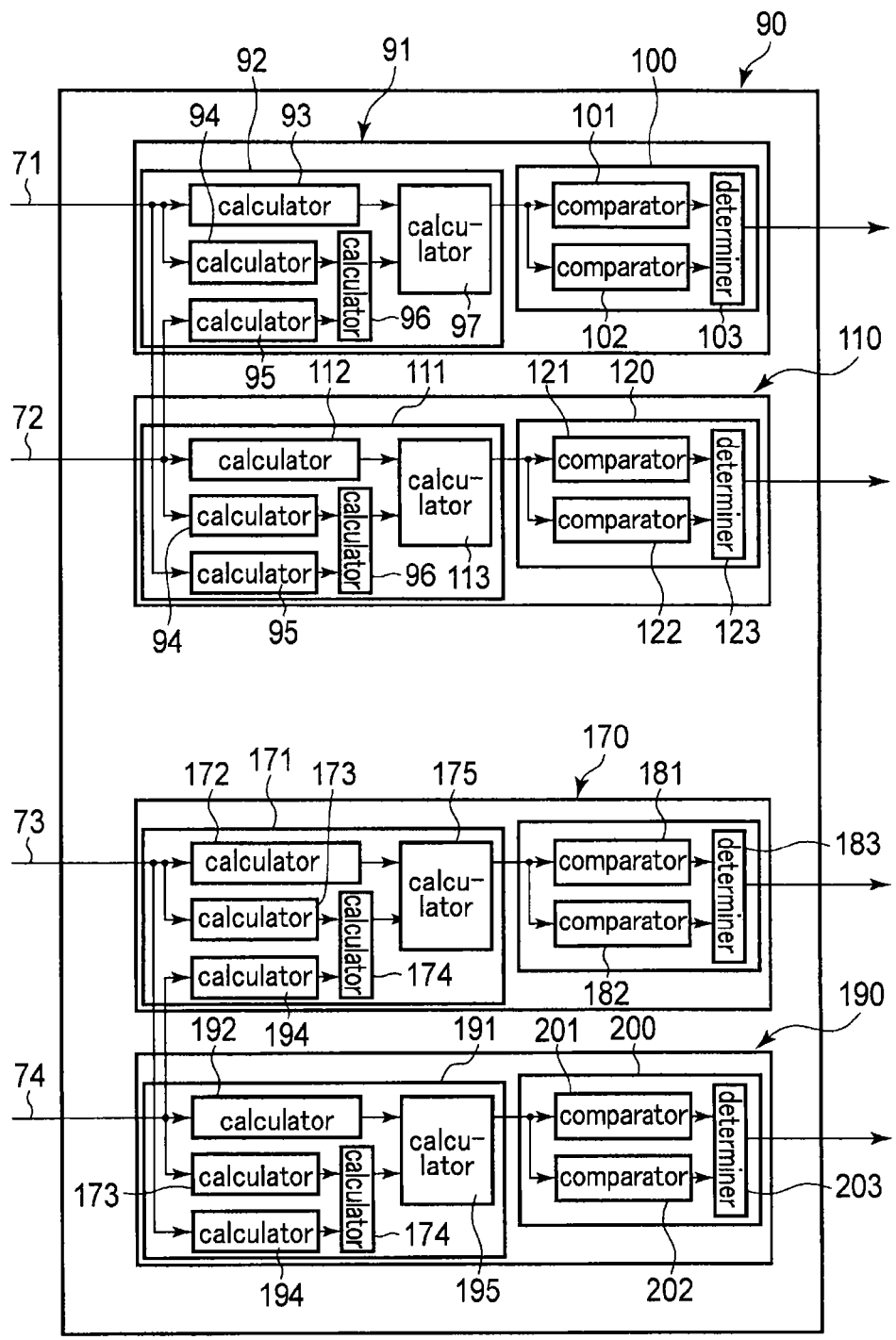
F I G. 20

DEFECT INSPECTION APPARATUS USING IMAGES OBTAINED BY OPTICAL PATH ADJUSTED

CROSS-REFERENCE TO RELATED APPLICATIONS

This application is based upon and claims the benefit of priority from Japanese Patent Application No. 2012-056468, filed, Mar. 13, 2012, the entire contents of which are incorporated herein by reference.

FIELD

Embodiments described herein relate generally to a defect inspection apparatus which detects a defect in a pattern of, for example, a semiconductor.

BACKGROUND

As a defect inspection apparatus which detects a defect in a pattern of a semiconductor, there is known a defect inspection apparatus which compares a target part of image data for a pattern with its periphery to detect a defect.

However, when the pattern of the semiconductor is finer, the signal level of the defect is lower, and the detection of the defect is more difficult. Therefore, the increase of the sensitivity of a sensor for defect detection has been suggested.

However, when the sensitivity of the sensor for defect detection is increased, the sensor detects and recognizes natural radiation and others as defects, resulting in false defect recognition.

There has been a need for an apparatus capable of accurately detecting a defect of a subject such as a pattern.

BRIEF DESCRIPTION OF THE DRAWINGS

FIG. 3 is a plan view showing a sensor surface of a first storage-type sensor of the defect inspection apparatus;

FIG. 5 is a diagram showing image data for a first range of the first storage-type sensor;

FIG. 6 is a diagram showing image data for a second range of the first storage-type sensor;

FIG. 7 is a plan view showing a glass substrate to be inspected by the defect inspection apparatus;

FIG. 9 is a plan view showing a part located in the vicinity of a second range in a sensor surface of a first storage-type sensor of the defect inspection apparatus;

FIG. 10 is a diagram showing image data for the second range;

FIG. 12 is a schematic diagram showing a part of the defect inspection apparatus in which first and second optical paths are more specifically shown;

FIG. 17 is a schematic diagram showing a defect inspection apparatus according to a fifth embodiment;

FIG. 20 is a block diagram showing a part of a defect determination circuit of the defect inspection apparatus;

DETAILED DESCRIPTION

In general, according to one embodiment, a defect inspection apparatus comprises an illumination optical system, an image formation optical system, an image data conversion unit, a singular part detecting circuit, an optical path length adjusting mechanism, and a defect determining unit. The illumination optical system illuminates a subject. The image formation optical system comprises an optical path dividing mechanism which divides, into first and second optical paths, light originating from the illumination optical system that has passed through or has been reflected by the subject. The image formation optical system forms an optical image derived from light passing through the first optical path and an optical image derived from light passing through the second optical path. The above optical images are optical images of the same part of the subject. The image data conversion unit converts, to image data, each of the optical images derived from the light passing through the first and second optical paths. The singular part detecting circuit detects a singular part relative to its periphery in each of the image data. The optical path length adjusting mechanism equalizes the optical path lengths of the first and second optical paths up to an imaging surface of the image data conversion unit. The defect determining unit determines a defect on the basis of singular part detection results of the two image data by the singular part detecting circuit.

Figure 1:
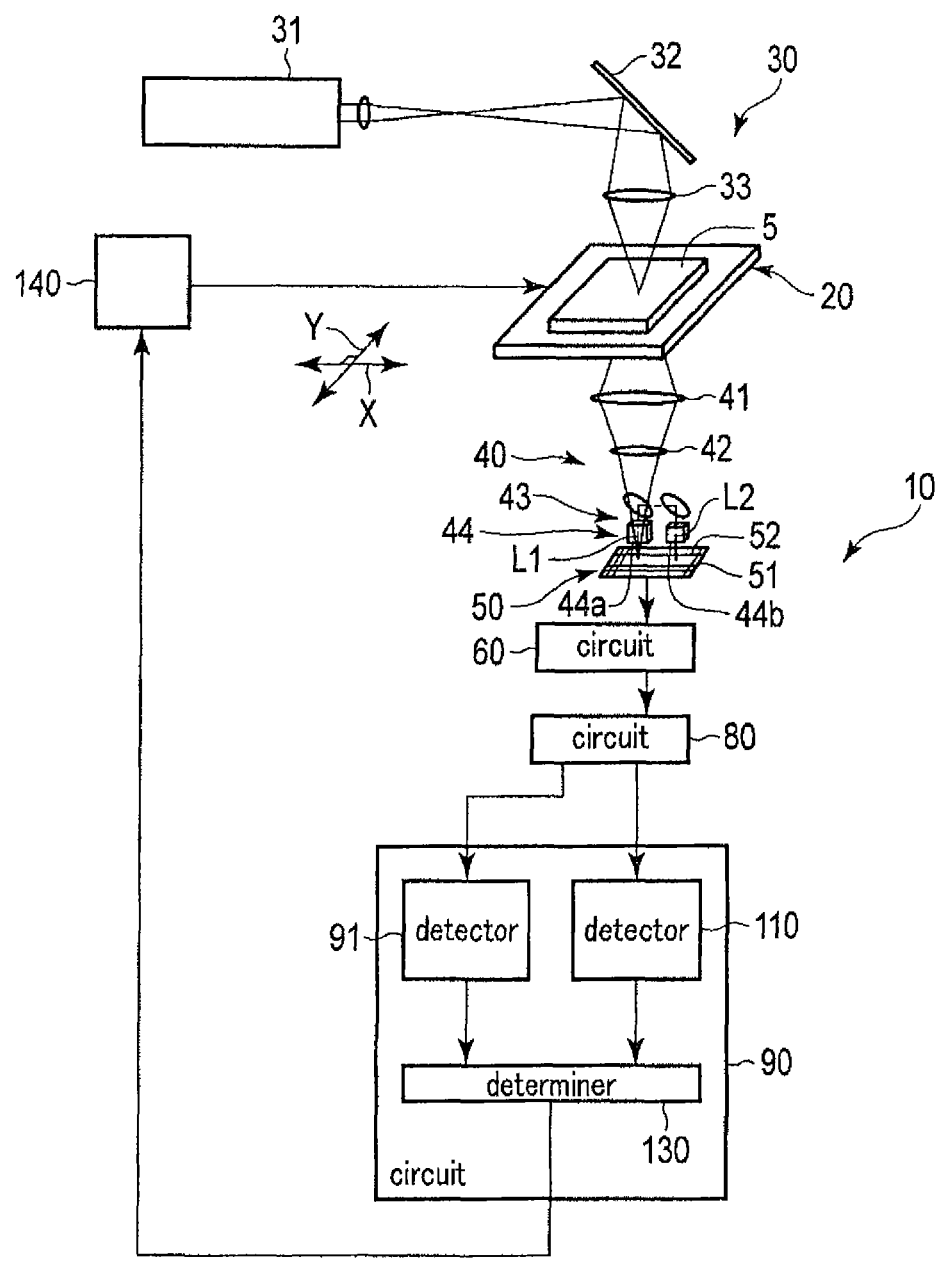
FIG. 1 is a schematic diagram showing a defect inspection apparatus according to a first embodiment.

A defect inspection apparatus according to a first embodiment is described with reference to FIGS. 1 to 4. FIG. 1 is a schematic diagram showing a defect inspection apparatus 10. In the present embodiment, the defect inspection apparatus 10 inspects a pattern formed on a glass substrate 5 for a defect by way of example. The glass substrate 5 on which the pattern is formed is an example of a subject to be inspected by the defect inspection apparatus 10.

As shown in FIG. 1, the defect inspection apparatus 10 comprises an XY table 20, an illumination optical system 30, an image formation unit 40, an image conversion unit 50, a defect determination circuit 90, and a control unit 140. The glass substrate 5 is fixed onto the XY table 20. The XY table 20 is movable along an X-axis X and a Y-axis Y that intersect at right angles with each other. The operation of the XY table 20 is controlled by the later-described control unit 140.

The illumination optical system 30 illuminates the glass substrate 5. The illumination optical system 30 comprises a laser light irradiator 31, a mirror 32, and a lens 33. A laser light emitted from the laser light irradiator 31 is reflected by the mirror 32 and then reaches the lens 33. The laser light is collected by the lens 33 and focused on the glass substrate 5. The laser light irradiates the glass substrate 5. The position of the laser light irradiation on the glass substrate 5 is adjusted by the movement of the XY table 20.

The laser light irradiating the glass substrate 5 passes through the glass substrate 5 and is guided to the image formation unit 40. The image formation unit 40 forms, on a later-described image formation surface of the image conversion unit 50, an optical image of the position of the laser light irradiation in the glass substrate 5.

The image formation unit 40 comprises an objective lens 41, an image formation lens 42, an optical path dividing mechanism 43, and an optical path length adjuster 44. The objective lens 41 and the image formation lens 42 are arranged in this order on the optical path of the laser light which has passed through the glass substrate 5. The objective lens 41 and the image formation lens 42 function to focus the laser light on the later-described image formation surface of the image conversion unit 50.

The optical path dividing mechanism 43 functions to divide the laser light which has passed through the objective lens 41 and the image formation lens 42 into a plurality of optical paths. In other words, the optical path on which the laser light emitted from the laser light irradiator 31 reaches the optical path dividing mechanism 43 is one line.

Figure 2:
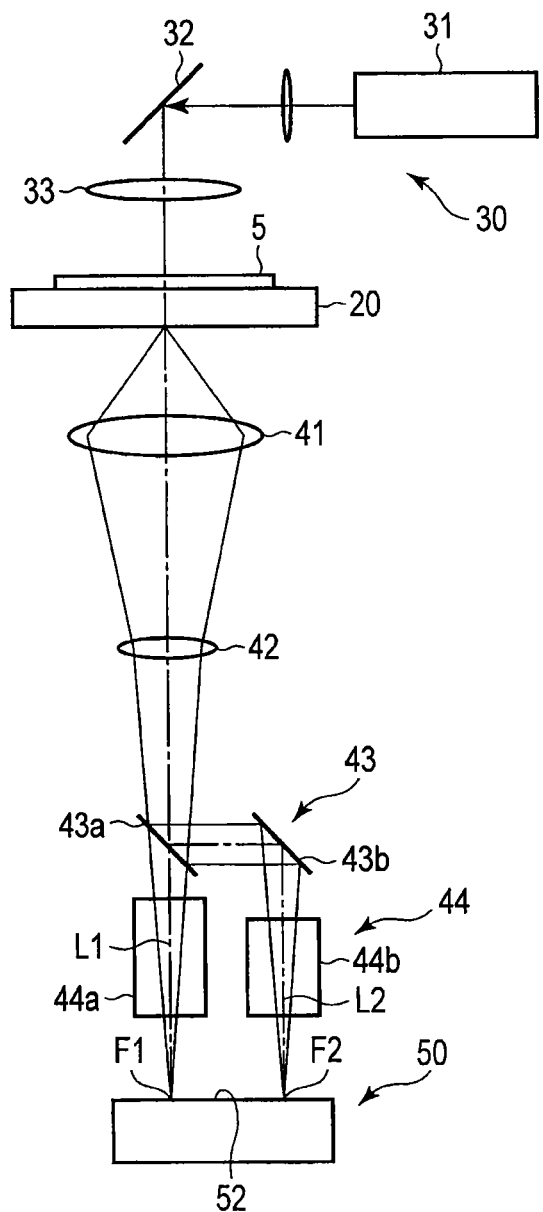
FIG. 2 is a schematic diagram showing a part of the defect inspection apparatus in which an optical path dividing mechanism is more specifically shown.

In the present embodiment, the optical path dividing mechanism 43 divides the optical path of the laser light into two lines. The divided optical paths are a first optical path L1 and a second optical path L2. FIG. 2 is a schematic diagram showing a part of the defect inspection apparatus 10 in which the optical path dividing mechanism 43 is more specifically shown. In FIG. 2, the part of the defect inspection apparatus 10 from the laser light irradiator 31 to the image conversion unit 50 is shown.

As shown in FIG. 2, the optical path dividing mechanism 43 comprises a first half mirror 43a and a first mirror 43b. The first half mirror 43a is located on the optical path of the laser light which has passed through the image formation lens 42. The first half mirror 43a passes 50 percent of the laser light, and reflects the remaining 50 percent toward the first mirror 43b. The optical path of the laser light which has passed through the first half mirror 43a is the first optical path L1. The first mirror 43b reflects 100 percent of the light reflected from the first half mirror 43a. The optical path of the laser light reflected by the first mirror 43b is the second optical path L2.

The optical path length adjuster 44 comprises a first plane parallel 44a and a second plane parallel 44b. The first plane parallel 44a is located on the first optical path L1. The second plane parallel 44b is located on the second optical path L2. The laser light beams which have passed through the first and second plane parallels 44a and 44b reach an imaging surface of the image conversion unit 50.

The first and second plane parallels 44a and 44b equalize the optical path lengths of the laser light beams reaching the imaging surface of the image conversion unit 50 through the first and second optical paths L1 and L2. In other words, of the laser light which has passed through the glass substrate 5, the laser light reaching the imaging surface of the image conversion unit 50 through the first optical path L1 and the laser light reaching the imaging surface of the image conversion unit 50 through the second optical path L2 are equalized in optical path length. The first and second plane parallels 44a and 44b also adjust the lengths of the first and second optical paths L1 and L2 to form focuses F1 and F2 of the laser light beams passing through the first and second optical paths L1 and L2 on the imaging surface of the image conversion unit 50.

The image conversion unit 50 converts the optical images formed through the first and second optical paths L1 and L2 to image data. As shown in FIG. 1, the image conversion unit 50 comprises a first storage-type sensor 51 and a first AD conversion circuit 60. The laser light beams passing through the first and second optical paths L1 and L2 reach a sensor surface 52 of the first storage-type sensor 51. The sensor surface 52 is an example of an imaging surface on which an optical image of the glass substrate 5 is formed. In the present embodiment, the optical image formed through the first optical path L1 and the optical image formed through the second optical path L2 are formed on the first storage-type sensor 51.

FIG. 3 is a plan view showing the sensor surface 52 of the first storage-type sensor 51. As shown in FIG. 3, the sensor surface 52 has a first range 53 in which the laser light passing through the first optical path L1 is formed into an image, and a second range 54 in which the laser light passing through the second optical path L2 is formed into an image. The first and second ranges 53 and 54 are equal to each other in shape and size.

The optical axis of the laser light passing through the first optical path L1 passes through a center C1 of the first range 53. The optical axis of the laser light passing through the second optical path L2 passes through a center C2 of the second range 54. Thus, in the present embodiment, two optical images are formed on the sensor surface of one storage-type sensor.

Both of the two optical images formed on the sensor surface 52 of the first storage-type sensor 51 show the same part on the glass substrate 5. The first storage-type sensor 51 converts the optical images formed in the first and second ranges 53 and 54 on the sensor surface 52 to electric signals, and outputs the electric signals to the first AD conversion circuit 60.

The first AD conversion circuit 60 converts the electric signal output by the first storage-type sensor 51 to image data 70. The image data 70 has image data 71 of the first range 53, and image data 72 of the second range 54. The image data 71 of the first range 53 is continuous image data obtained by the conversion of the optical image formed in the first range 53 to an electric signal by the storage-type sensor by the scanning of the XY stage. Similarly, the image data 72 of the second range 54 is continuous image data obtained by the conversion of the optical image formed in the second range 54 to an electric signal by the storage-type sensor by the scanning of the XY stage. The image data 70, that is, the image data 71 and image data 72 are the data continuously outputted by scanning the XY stage.

As shown in FIG. 1, the first AD conversion circuit 60 is connected to a first distribution circuit 80. The first distribution circuit 80 separates the image data 70 into the image data 71 for the optical image formed in the first range 53, and the image data 72 for the optical image formed in the second range 54. The first distribution circuit 80 is connected to the defect determination circuit 90.

The defect determination circuit 90 comprises a first range singular part detector 91, a second range singular part detector 110, and a defect determiner 130. The first distribution circuit 80 is connected to the first and second range singular part detectors 91 and 110. The first distribution circuit 80 sends the image data 71 and 72 of the first and second ranges 53 and 54 to the first range singular part detector 91, and sends the image data 71 and 72 of the first and second ranges 53 and 54 to the second range singular part detector 110.

Figure 4:
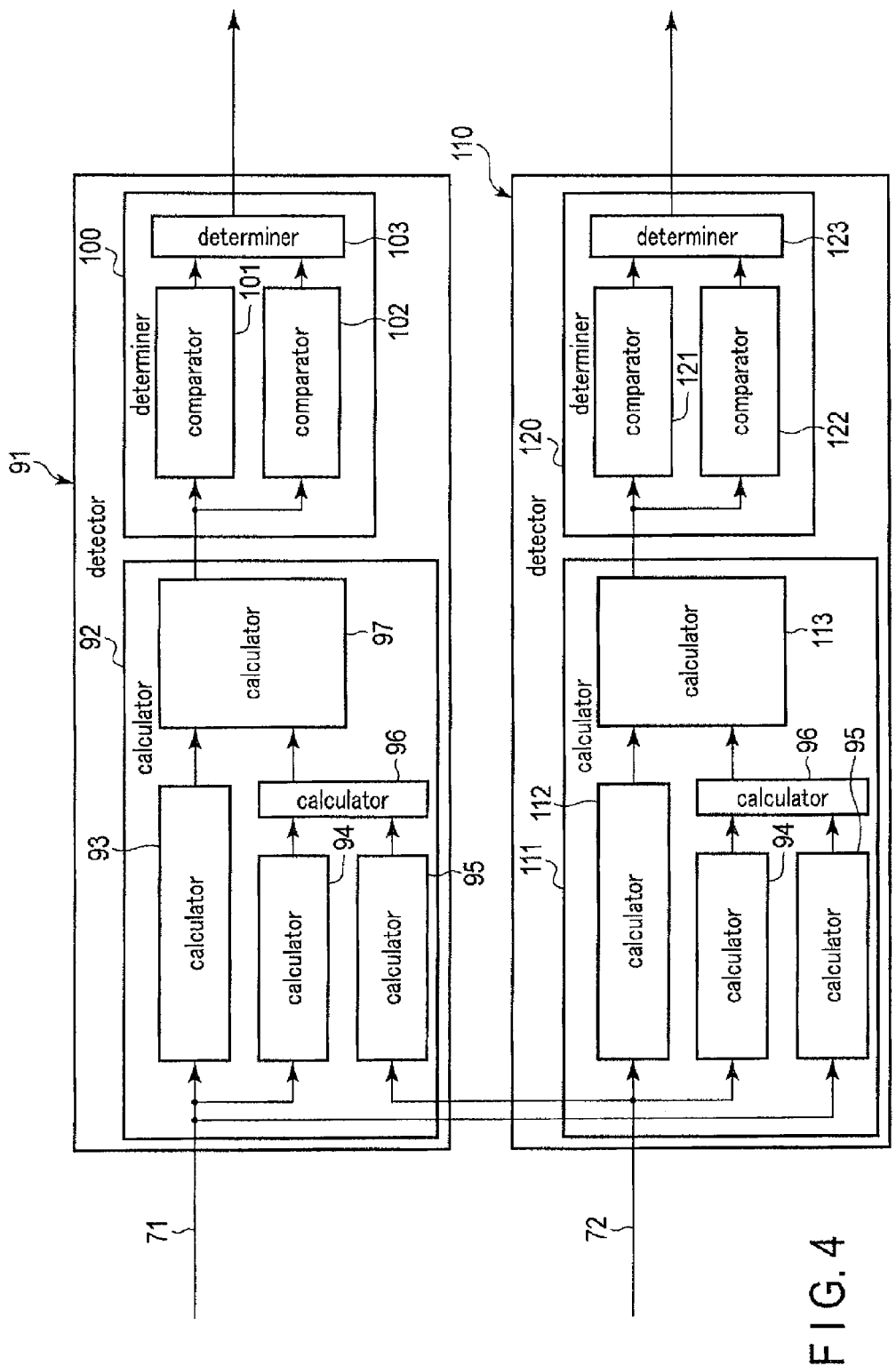
FIG. 4 is a block diagram showing first and second range singular part detecting circuits of the defect inspection apparatus.

FIG. 4 is a block diagram showing the first and second range singular part detectors 91 and 110. As shown in FIG. 4, the first range singular part detector 91 comprises a first range output displacement calculator 92 and a first range threshold determiner 100.

The first range output displacement calculator 92 calculates the difference between the output level of each pixel of the image data 71 and the output level of the peripheral region in order to determine whether each pixel contained in the image data 71 continuously obtained by changing the optical image on the first range 53 into image data is a singular part. In this case, each pixel of the image data is a notice pixel. The first range output displacement calculator 92 comprises a first range notice pixel output level calculator 93, a first range peripheral region output level calculator 94, a second range peripheral region output level calculator 95, a peripheral region output level average calculator 96, and a first range output level difference calculator 97.

The image data 71 of the first range 53 is sent to the first range notice pixel output level calculator 93.

The first range notice pixel output level calculator 93 calculates the output level of all pixels contained in the image data 71 on the basis of the image data 71 of the first range 53. The image data 71 is continuously flow in the first range 53.

FIG. 5 shows the image data of the 7×7 pixels including the peripheral pixels around the notice pixel, based on the first range 53. FIG. 6 shows the image data of the 7×7 pixels including the peripheral pixels around the notice pixel, based on the second range 54. Each of the notice pixels 71a and 72a of the image data 71 and 72 of the first and second ranges 53 and 54 is indicated by one pixel. Parts in the image data 71 and 72 corresponding to the peripheral regions 53b and 54b are peripheral regions 71b and 72b. In FIGS. 5 and 6, the peripheral regions 71b and 72b are parts other than the notice pixels 71a and 72a.

The image data 71 of the first range 53 is sent to the first range peripheral region output level calculator 94. On the basis of the image data 71 of the first range 53, the first range peripheral region output level calculator 94 calculates an average output level of the pixels of the peripheral region 71b of the image data 71. The calculation result by the first range peripheral region output level calculator 94 is sent to the peripheral region output level average calculator 96.

The image data 72 of the second range 54 is sent to the second range peripheral region output level calculator 95. On the basis of the image data 72 of the second range 54, the second range peripheral region output level calculator 95 calculates an average output level of the pixels of the peripheral region 72b of the image data 72. The calculation result by the second range peripheral region output level calculator 95 is sent to the peripheral region output level average calculator 96.

The peripheral region output level average calculator 96 calculates an average of the calculation result of the first range peripheral region output level calculator 94 and the second range peripheral region output level calculator 95.

The calculation result by the first range notice pixel output level calculator 93 and the calculation result by the peripheral region output level average calculator 96 are sent to the first range output level difference calculator 97. The first range output level difference calculator 97 subtracts the calculation result by the peripheral region output level average calculator 96 from the calculation result by the first range notice pixel output level calculator 93. The calculation result by the first range output level difference calculator 97 is sent to the first range threshold determiner 100. The subtraction of the calculation result by the peripheral region output level average calculator 96 from the calculation result by the first range notice pixel output level calculator 93 is the calculation of the difference between the calculation result by the first range center output level calculator 93 and the calculation result by the peripheral region output level average calculator 96.

The first range threshold determiner 100 compares the calculation result by the first range output level difference calculator 97 with a predetermined threshold, and determines whether, for example, the part of 53a of the first range 53 is a singular part. As shown in FIG. 4, the first range threshold determiner 100 comprises a first comparator 101, a second comparator 102, and a first range singular part determiner 103.

The calculation result is sent to the first comparator 101 from the first range output level difference calculator 97. The first comparator 101 determines whether the calculation result is more than a first threshold Lvl1. The calculation result is sent to the second comparator 102 from the first range output level difference calculator 97. The second comparator 102 determines whether the calculation result is less than a second threshold Lvl2. The first threshold Lvl1 is a positive value, and the second threshold Lvl2 is a negative value.

The calculation results by the first and second comparators 101 and 102 are sent to the first range singular part determiner 103. On the basis of the detection results by the first and second comparators 101 and 102, the first range singular part determiner 103 determines whether the notice pixel 71a of the image data 71 of the first range 53 is a singular part.

The singular part is described here. The singular part is a part which is high or low in output level as compared to the periphery. If a defect is present on the glass substrate 5, the output level of a part corresponding to the defect in the image data is high or low as compared to the output levels of nondefective parts.

As regards the first range threshold determiner 100, when the output level of the notice pixel 71a is more than the first threshold Lvl1, this indicates that the notice pixel 71a is a singular part. When the output level of the notice pixel 71a is less than the second threshold Lvl2, this indicates that the notice pixel 71a of the image data 71 is a singular part.

The first range singular part determiner 103 determines whether the notice pixel 71a of the first range 53 is a singular part on the basis of the calculation result by the first range output level difference calculator 97 and the comparison results by the first and second comparators 101 and 102. More specifically, when the calculation result by the first range output level difference calculator 97 is more than the first threshold Lvl1 or when the calculation result by the first range output level difference calculator 97 is less than the second threshold Lvl2, the center 71a of the image data 71 is determined to be a singular part.

In this way, the first range singular part detector 91 detects whether the center 71a of the image data 71 is a singular part. As shown in FIG. 1, the determination result by the first range singular part determiner 103 is sent to the defect determiner 130.

Now, the second range singular part detector 110 is described. As shown in FIG. 4, the second range singular part detector 110 comprises a second range output displacement calculator 111 and a second range threshold determiner 120.

The second range output displacement calculator 111 calculates the difference between the output level of each pixel of the image data 72 and the output level of the peripheral region in order to determine whether each pixel contained in the image data 72 continuously obtained by changing the optical image on the second range 54 into image data is a singular part. In this case, each pixel of the image data is a notice pixel. The second range output displacement calculator 111 comprises a second range notice pixel output level calculator 112, a first range peripheral region output level calculator 94, a second range peripheral region output level calculator 95, a peripheral region output level average calculator 96, and a second range output level difference calculator 113.

The image data 72 of the second range 54 is sent to the second range notice pixel output level calculator 112.

The second range notice pixel output level calculator 112 calculates the output level of all pixels contained in the image data 72 on the basis of the image data 72 of the second range 54. The image data 72 is continuously flow in the second range 54.

FIG. 5 shows the image data of the 7×7 pixels including the peripheral pixels around the notice pixel, based on the first range 53. FIG. 6 shows the image data of the 7×7 pixels including the peripheral pixels around the notice pixel, based on the second range 54. Each of the notice pixels 71a and 72a of the image data 71 and 72 of the first and second ranges 53 and 54 is indicated by one pixel. Parts in the image data 71 and 72 corresponding to the peripheral regions 53b and 54b are peripheral regions 71b and 72b. In FIGS. 5 and 6, the peripheral regions 71b and 72b are parts other than the notice pixels 71a and 72a.

The image data 71 of the first range 53 is sent to the first range peripheral region output level calculator 94. On the basis of the image data 71 of the first range 53, the first range peripheral region output level calculator 94 calculates an average output level of the pixels of the peripheral region 71b of the image data 71. The calculation result by the first range peripheral region output level calculator 94 is sent to the peripheral region output level average calculator 96.

The image data 72 of the second range 54 is sent to the second range peripheral region output level calculator 95. On the basis of the image data 72 of the second range 54, the second range peripheral region output level calculator 95 calculates an average output level of the pixels of the peripheral region 72b of the image data 72. The calculation result by the second range peripheral region output level calculator 95 is sent to the peripheral region output level average calculator 96.

The peripheral region output level average calculator 96 calculates an average of the calculation result of the first range peripheral region output level calculator 94 and the second range peripheral region output level calculator 95.

The calculation result by the second range notice pixel output level calculator 112 and the calculation result by the peripheral region output level average calculator 96 are sent to the second range output level difference calculator 113. The second range output level difference calculator 113 subtracts the calculation result by the peripheral region output level average calculator 96 from the calculation result by the second range notice pixel output level calculator 112. The calculation result by the second range output level difference calculator 113 is sent to the second range threshold determiner 120. The subtraction of the calculation result by the peripheral region output level average calculator 96 from the calculation result by the second range notice pixel output level calculator 112 is the calculation of the difference between the calculation result by the second range center output level calculator 112 and the calculation result by the peripheral region output level average calculator 96.

The second range threshold determiner 121 compares the calculation result by the second range output level difference calculator 113 with a predetermined threshold, and determines whether the, for example, part of 54a of the second range 54 is a singular part. As shown in FIG. 4, the second range threshold determiner 120 comprises a first comparator 121, a second comparator 122, and a second range singular part determiner 123.

The calculation result is sent to the first comparator 121 from the second range output level difference calculator 113. The first comparator 121 determines whether the calculation result is more than a first threshold Lvl1. The calculation result is sent to the second comparator 122 from the second range output level difference calculator 113. The second comparator 122 determines whether the calculation result is less than a second threshold Lvl2. The first threshold Lvl1 is a positive value, and the second threshold Lvl2 is a negative value.

The calculation results by the first and second comparators 121 and 122 are sent to the second range singular part determiner 123. On the basis of the detection results by the first and second comparators 121 and 122, the first range singular part determiner 123 determines whether the notice pixel 72a of the image data 72 of the second range 54 is a singular part.

As regards the first range threshold determiner 120, when the output level of the notice pixel 72a is more than the second threshold Lvl1, this indicates that the notice pixel 72a is a singular part. When the output level of the notice pixel 72a is less than the second threshold Lvl2, this indicates that the notice pixel 72a of the image data 72 is a singular part.

The second range singular part determiner 110 determines whether the notice pixel 72a of the second range 54 is a singular part on the basis of the calculation result by the second range output level difference calculator 113 and the comparison results by the first and second comparators 121 and 122. More specifically, when the calculation result by the second range output level difference calculator 113 is more than the first threshold Lvl1 or when the calculation result by the second range output level difference calculator 113 is less than the second threshold Lvl2, the center 72a of the image data 72 is determined to be a singular part.

In this way, the second range singular part detector 110 detects whether the center 72a of the image data 72 is a singular part. As shown in FIG. 1, the determination result by the first range singular part determiner 103 is sent to the defect determiner 130.

On the basis of the detection result by the first range singular part detector 91 and the detection result by the second range singular part detector 110, the defect determiner 130 determines whether, for example, the centers 53a and 54a of the first and second ranges 53 and 54 is a defect by scanning whole part of the inspection range of the glass substrate 5.

As described above, the optical images of the same part of the glass substrate 5 are formed in the first and second ranges 53 and 54. Therefore, the optical images of the same part of the glass substrate 5 are formed, for example, in both the centers 53a and 54a of the first and second ranges 53 and 54.

If the detection result by the first range singular part detector 91 shows that, for example, the center 53a of the first range 53 is a singular part and if the detection result by the second range singular part detector 110 shows that the center 54a of the second range 54 corresponding to the center 53a of the first rage 53 is a singular part, the defect determiner 130 determines that a defect is formed in the part of the glass substrate 5 corresponding to the centers 53a and 54a.

As described above, the singular part indicated by the image data is formed by the defect formed on the glass substrate 5, and is also formed, for example, by the radiation and cosmic rays around the sensor surface 52 of the first storage-type sensor 51 rather than by the defect.

The defect is formed as optical images in the first and second ranges 53 and 54, and therefore appears as singular parts in both the image data 71 and 72 of the first and second ranges 53 and 54. However, the radiation and the cosmic rays do not appear in the corresponding parts of the first and second ranges 53 and 54 in the same manner. In other words, the singular parts that appear in the image data 71 and 72 by causes other than the defect do not appear in the same position.

Therefore, when the notice pixels 71a and 72a are singular parts, that is, when both the parts of the first and second ranges 53 and 54 corresponding to each other are determined to be singular parts, a defect is formed in the part of the glass substrate 5 corresponding to the notice pixels 71a and 72a. Thus, the defect determiner 130 determines that the part of the glass substrate 5 corresponding to the notice pixels 71a and 72a are defects only when both the notice pixels 71a and 72a are determined to be singular parts. The determination result by the defect determiner 130 is sent to the control unit 140.

The control unit 140 calculates the position in the glass substrate 5 corresponding to the positions of the notice pixels 71a and 72a on the basis of the result sent from the defect determiner 130, and displays the calculated positions, for example, on a monitor. Displaying on the monitor is an example of means for informing an operator or the like.

During the movement of the XY table 20, the control unit 140 is controlled so that the whole part of the glass substrate 5 which needs to be inspected will be formed as optical images in the first and second ranges 53 and 54. Thus, when a defect is formed somewhere in the range of the glass substrate 5 which needs to be inspected, optical images of this defect are formed in the first and second ranges 53 and 54, so that the defect is determined to be a defect in the defect determiner 130.

Now, the operation of the defect inspection apparatus 10 is described. In the case described first, a defect is formed on the glass substrate 5. FIG. 7 is a plan view showing the glass substrate 5. As shown in FIG. 7, a pattern 6 is formed on the glass substrate 5. The pattern 6 is A-shaped by way of example. A defect 7 is formed in the pattern 6. The defect 7 drawn in FIG. 7 is shown in exaggerated size, but is in reality extremely small.

The pattern 6 is A-shaped by way of example in the present embodiment, but is extremely fine in reality. Therefore, the images formed in the first and second ranges 53 and 54 are blurred. Thus, the part of the glass substrate 5 where the pattern 6 is formed and the part where the pattern 6 is not formed are formed into images substantially in the same manner. However, the transmittance of the laser light decrees at the defect 7, or the laser light which has transmitted through the defect is scattered by the defect 7, so that in the first and second ranges 53 and 54, the defect 7 is formed into images different in output from the pattern 6 or from the part where the pattern 6 is not formed. As a result, the output level of the indicated defect 7 is different from the output level of other parts in the image data 71 and 72 generated in the first AD conversion circuit 60.

In this way, the control unit 140 moves on the XY table 20 and thus determines a defect while imaging the whole surface of the glass substrate 5 by the first and second storage-type sensors 51 and 52. The control unit 140 then stores the coordinates and image of the position which has been determined to be defective.

After the inspection of the whole surface of the glass substrate 5, the control unit 140 moves on the XY table 20 to the defective position to check the defect. The position which has been determined to be defective is then inspected again.

In the present embodiment, the laser light which has passed through the glass substrate 5 is divided into the two optical paths so that two optical images are formed in the first and second ranges 53 and 54 of the sensor surface 52 of the first storage-type sensor 51. The optical path lengths of the first and second optical paths L1 and L2 up to the sensor surface 52 are the same. Moreover, singular parts, for example, in the centers 53a and 54a of the first and second ranges 53 and 54 are detected. Only when both the centers 53a and 54a are singular parts is a defect determined to be formed in the part of the glass substrate 5 corresponding to the centers 53a and 54a. When a singular part is only formed in one of the centers 53a and 54a, the singular part is determined to be attributed to causes other than the defect, and is thus not a defect.

Consequently, a defect can be accurately detected. This is described in detail. A pattern formed in the glass substrate 5 tends to be finer. Accordingly, a defect formed in the pattern also tends to be finer. It is therefore necessary to increase the sensitivity of the first storage-type sensor 51 to detect a defect. However, when the sensitivity of the first storage-type sensor 51 is increased, the first storage-type sensor 51 may also detect, for example, radiation and the cosmic rays other than a defect. This detection may lead to an erroneous detection.

However, in the present embodiment, if, for example, both the centers 53a and 54a of the first and second ranges 53 and 54 of the first storage-type sensor 51 are not singular parts, these singular parts are not determined to be defects. The singular parts attributed to causes other than a defect are unlikely to be formed at the same time in the image data 71 and 72 of the first and second ranges 53 and 54. Thus, in the present embodiment, a defect can be accurately detected.

Furthermore, in the present embodiment, the first and second ranges 53 and 54 are formed on the sensor surface 52 of one storage-type sensor. Therefore, the position of the first range 53 can be easily coordinated with the position of the second range 54, so that a defect can be accurately detected. This is described in detail.

For example, the laser light which has passed through the glass substrate 5 is split into the first and second optical paths L1 and L2, and a storage-type sensor for forming the first optical path L1 into an image is different from a storage-type sensor for forming the second optical path L2 into an image. In this case, the position of one sensor can be misaligned with the position of the other sensor.

In the sensor with the misaligned position, the range in which an optical image is formed in the sensor surface of this sensor is misaligned relative to the optical image. In other words, the optical axis of the optical path is misaligned with the central position of the range in which the optical image is formed, so that the center of the optical image is misaligned with the center of the range in which the optical image is formed.

As a result, even if a singular part is formed in the center in one sensor because of the defect, a singular part may be formed in a peripheral region in the other sensor. In this case, the defect determiner 130 does not determine that this singular part is a defect.

However, in the present embodiment, the laser light passing through the first and second optical paths L1 and L2 is formed into images on the first and second ranges 53 and 54 on the sensor surface 52 of one first storage-type sensor 51. Therefore, the position of the first range 53 is not easily misaligned relative to the first optical path L1, or the position of the second range 54 is not easily misaligned relative to the second optical path L2. As a result, the singular parts attributed to the defect are formed at corresponding positions in the image data 71 and 72 of the first and second ranges 53 and 54. Thus, a defect can be accurately detected.

In the present embodiment, an optical path is divided into two optical paths as an example of dividing the optical path into a plurality of parts. The optical path lengths of the optical paths up to the sensor surface are equal to each other. When an optical path is divided into two or more parts, an optical image is converted to image data as in the case with the first and second range singular part detectors 91 and 110, and a singular part detector is provided, for each optical path. The optical path lengths of the respective optical paths up to the imaging surface where the optical image is formed are equal to each other. When all the singular part detectors provided in the optical paths detect singular parts, the defect determiner 130 determines that a defect is formed in the part of the glass substrate 5 corresponding to the centers in the image data of the optical paths. This allows functions and advantageous effects similar to those according to the present embodiment to be obtained.

Now, a defect inspection apparatus according to a second embodiment is described with reference to FIGS. 13 to 15. Components similar in function to those according to the first embodiment are indicated by the same reference numerals as those according to the first embodiment and are not described. In the present embodiment, the second range singular part detector is different from that in the first embodiment. The present embodiment is the same as the first embodiment in other respects. The differences are described.

Figure 8:
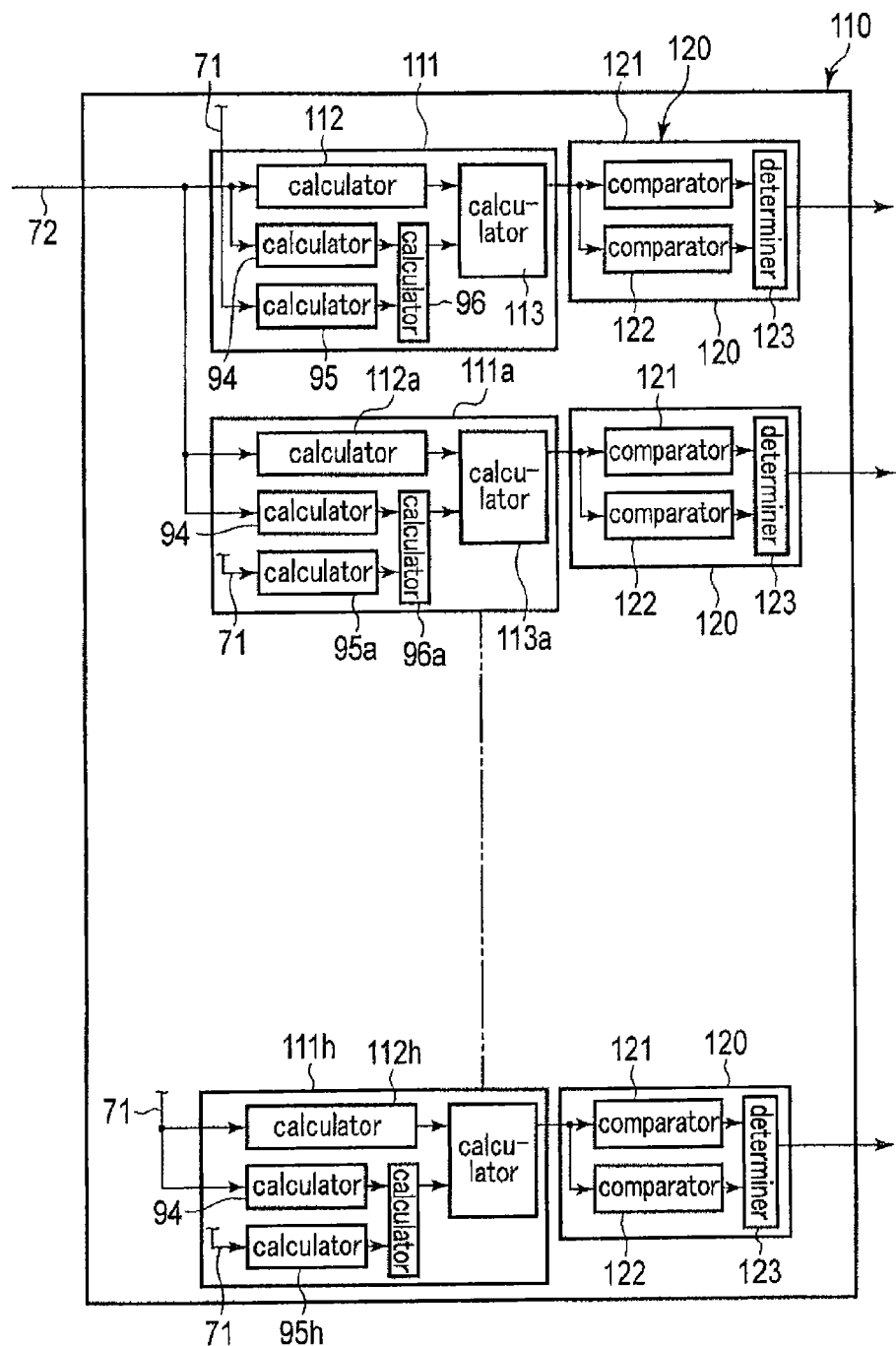
FIG. 8 is a block diagram showing a second range singular part detecting circuit of a defect inspection apparatus according to a second embodiment.

FIG. 8 shows a second range singular part detector 110 according to the present embodiment. In the present embodiment, the second range singular part detector 110 detects whether the center 72a of the image data 72 of the second range 54 is a singular part, and also determines whether a predetermined range around the center 72a is a singular part.

FIG. 9 shows a second range 54 in the sensor surface 52 of the first storage-type sensor 51. FIG. 9 shows the center 54a as an example of the center of the second range 54, and a predetermined region 54c which is a predetermined range around the center 54a. FIG. 10 shows the image data 72 of the second range 54. As shown in FIG. 10, the predetermined region 54c is indicated by 3×3 pixels around one pixel that represents the center 54a, in the present embodiment.

As described above, in the present embodiment, the second range singular part detector 110 also detects a singular part in the predetermined region 54c. Thus, as shown in FIG. 8, the second range singular part detector 110 according to the present embodiment comprises, in addition to the second range center output level calculator 112, a predetermined region output level calculator to determine whether each of the pixels indicating the predetermined region 54c is a singular part. In the present embodiment, a predetermined region 72c corresponding to the predetermined region 54c in the image data 72 is indicated by the center 72a as an example of the center of the second range 54 and nine pixels arranged around one pixel that represents the center 72a. The eight pixels arranged around the center 72a are first to eighth pixels 141, 142, 143, 144, 145, 146, 147, and 148.

The second range singular part detector 110 according to the present embodiment determines whether the first to eighth pixels 141 to 148 are singular parts in the same manner as determining whether the center is a singular part. Therefore, as shown in FIG. 8, the second range singular part detector 110 according to the present embodiment has a second range output displacement calculator and a second range threshold determiner formed for each of the first to eighth pixels 141 to 148 and the center 72a.

A second range output displacement calculator 111a and a second range threshold determiner 120 are used to detect whether the first pixel 141 is a singular part. A second range output displacement calculator 111b and a second range threshold determiner 120 are used to detect whether the second pixel 142 is a singular part. A second range output displacement calculator 111c and a second range threshold determiner 120 are used to detect whether the third pixel 143 is a singular part. A second range output displacement calculator 111d and a second range threshold determiner 120 are used to detect whether the fourth pixel 144 is a singular part. A second range output displacement calculator 111e and a second range threshold determiner 120 are used to detect whether the fifth pixel 145 is a singular part. A second range output displacement calculator 111f and a second range threshold determiner 120 are used to detect whether the sixth pixel 146 is a singular part. A second range output displacement calculator 111g and a second range threshold determiner 120 are used to detect whether the seventh pixel 147 is a singular part. A second range output displacement calculator 111h and a second range threshold determiner 120 are used to detect whether the eighth pixel 148 is a singular part.

Among the second range output displacement calculators 111a to 111h and the second range threshold determiners 120 used for the first to eighth pixels 141 to 148, the second range output displacement calculator 111a and the second range threshold determiner 120a used for the first pixel 141 are described by way of example.

As shown in FIG. 8, the second range output displacement calculator 111a used for the first pixel 141 comprises a first pixel output level calculator 112a instead of the second range center output level calculator 112. The image data 72 of the second range 54 is sent to the first pixel output level calculator 112a. The first pixel output level calculator 112a calculates an output level of the first pixel 141, on the basis of the image data 72 of the second range 54.

The second range output displacement calculator 111a comprises a second range peripheral region output level calculator 95a instead of the second range peripheral region output level calculator 95. The image data 72 is sent to the second range peripheral region output level calculator 95a. The second range peripheral region output level calculator 95a regards parts of the image data 72 other than the first pixel 141 as peripheral regions, and calculates and adds up the output levels of the pixels other than the first pixel 141. The first range peripheral region output level calculator 94 is the same as that in the first embodiment.

The second range output displacement calculator 111a comprises a peripheral region output level average calculator 96a instead of the peripheral region output level average calculator 96. The calculation result by the second range peripheral region output level calculator 95a and the calculation result by the first range peripheral region output level calculator 94 are sent to the peripheral region output level average calculator 96a. The peripheral region output level average calculator 96a calculates the average of the calculation results by the first and second range peripheral region output level calculators 94a and 95.

This average value indicates the average of the output levels from the range of the same size as the center 72a in the combination of the parts of the image data 72 other than the first pixel 141 and the peripheral region 71b. In the present embodiment, the center 72a is represented by one pixel, so that the aforementioned divisional value is the average of the output levels of the peripheral regions.

The second range output displacement calculator 111a comprises a second range output level difference calculator 113a instead of the second range output level difference calculator 113. The second range output level difference calculator 113a subtracts the calculation result by the peripheral region output level average calculator 96a from the calculation result by the first pixel output level calculator 112a. The calculation result by the second range output level difference calculator 113a is sent to the second range threshold determiner 120.

The second range threshold determiner 120 is the same as that in the first embodiment. The first comparator 121 determines whether the calculation result by the second range output level difference calculator 113a is more than the first threshold Lvl1. The second comparator 122 determines whether the calculation result by the second range output level difference calculator 113a is less than the second threshold Lvl2.

Thus, the second range output displacement calculator 111a for the first pixel 141 is substantially similar to the second range output displacement calculator 111 described in the first embodiment. One difference therebetween is that the data for the first pixel 141 is used instead of the data for the center 72a for the processing in the second range output displacement calculator 111. Another difference therebetween is that the data for parts other the first pixel 141 is used instead of the data for the peripheral region 72b.

The second range output displacement calculators 111 and 111b to 111h used for the second to eighth pixels 142 to 148 and the center pixel 72a are also similar to the second range output displacement calculator 111a. More specifically, each of the second range output displacement calculators 111b to 111h is substantially similar to the second range output displacement calculator 111 described in the first embodiment. One difference is that the data for the second to eighth pixels 142 to 148 are used instead of the data for the center 71a used in the second range output displacement calculator 111. Another difference is that the data for parts other the second to eighth pixels 142 to 148 are used instead of the data for the peripheral region 72b.

In FIG. 8, the second range output displacement calculators 111, 111a, and 111h are shown, and 111b to 111g are not shown. The second range output displacement calculator 111h comprises an eighth pixel output level calculator 112h, a second range peripheral region output level calculator 95h, and an output level average calculator 96h. Thus, each of the second range output displacement calculators 111b to 111g has a corresponding one of the output level calculators 112b to 112g for calculating the output level of the corresponding one of the second to seventh pixels 142 to 147, a corresponding one of the second range peripheral region output level calculators 95b to 95g, and a corresponding one of the output level average calculators 96b to 96g.

The determination result by the second range singular part determiner 123 set for the center 72a and the first to eighth pixels 141 to 148 is sent to the defect determiner 130.

In the present embodiment, if the first range singular part determiner 103 determines that the center 71a is a singular part and if a singular part is detected in the detection result by the second range singular part determiner 123 provided for the center 72a or in the detection results by the second range singular part determiners 123 provided for the first to eighth pixels 141 to 148, the defect determiner 130 determines that the singular parts are defects. The singular parts in this case are the centers 71a and 72a.

For example, the first range singular part determiner 103 determines that a singular part is formed in the center 71a of the image data 71 of the first range 53, and the second range singular part determiner 123 provided for the center 72a in the second range singular part detector 110 determines that the center 72a is a singular part. It is then determined that a defect is formed in the part of the glass substrate 5 corresponding to the centers 53a and 54a of the first and second ranges 53 and 54. Meanwhile, the first range singular part determiner 103 determines that a singular part is formed in the center 71a of the image data 71 of the first range 53, and the second range singular part determiner 123 provided for the first pixel 141 determines that the first pixel 141 is a singular part. It is then determined that defect is formed in the position in the glass substrate 5 corresponding to the centers 53a and 54a of the first and second ranges 53 and 54.

In the present embodiment, a singular part is also detected in the predetermined region 54c set around the center 54a of the second range 54. Thus, a defect can be accurately detected. This is described in detail.

For example, the optical axis of the laser light passing through the second optical path L2 may be misaligned with the center C2 of the second range 54. In this case, the position of the optical image relative to the second range 54 changes. As a result, even if a defect is formed on the glass substrate 5, the defect is not detected because the position where the defect is formed into an image is different in the first and second ranges 53 and 54. For example, the optical image of the defect on the glass substrate 5 may be formed in the center 53a in the first range 53, and the optical image of the defect on the glass substrate 5 may be formed in the peripheral region 54b in the second range 54. In this case, the defect is not determined to be a defect.

However, in the present embodiment, a defect is detected in the second range 54 not only in the center 54a but also in the predetermined 3×3 pixels region 54c around the center 54a. Thus, even if the singular parts in the first and second ranges 53 and 54 are misaligned, this misalignment can be absorbed, so that a defect can be accurately detected.

In the present embodiment, the second range singular part detector 110 detects the singular part in the predetermined region 72c of the image data 72. Alternatively, as in the case with the predetermined region 72c, the singular part in a predetermined region set for the center 71a in the image data 71 of the first range 53 may be detected. The position, size, and shape of the predetermined region for the center 71a are the same as the position, size, and shape of the predetermined region 72c for the center 72a.

The first and second optical paths L1 and L2 in the present embodiment are examples of the multiple optical paths. When the optical path is divided into three or more parts, the optical image is converted to image data, and a singular part detector similar to the first and second range singular part detectors 91 and 110 is provided, for each optical path. The singular part detector provided for one optical path only detects a singular part in the center of the image data. The singular part detectors provided for the remaining optical paths other than the one optical path detect singular parts in the center and predetermined regions of the image data. When the singular part detector which only detects a singular part in the center detects a singular part and when all the remaining singular part detectors detect singular parts in the centers or the predetermined regions, the defect determiner determines that a defect is formed in the part of the glass substrate 5 corresponding to the center of the image data.

Consequently, it is possible to obtain advantageous effects similar to those according to the present embodiment.

Now, a defect inspection apparatus according to a third embodiment is described with reference to FIGS. 11 to 13. Components similar in function to those according to the first embodiment are indicated by the same reference numerals as those according to the first embodiment and are not described.

The present embodiment is different from the first embodiment in that a second storage-type sensor 55 is used in addition to the first storage-type sensor 51 and in the optical path length adjuster 44. The present embodiment is the same as the first embodiment in other respects. The differences are described.

Figure 11:
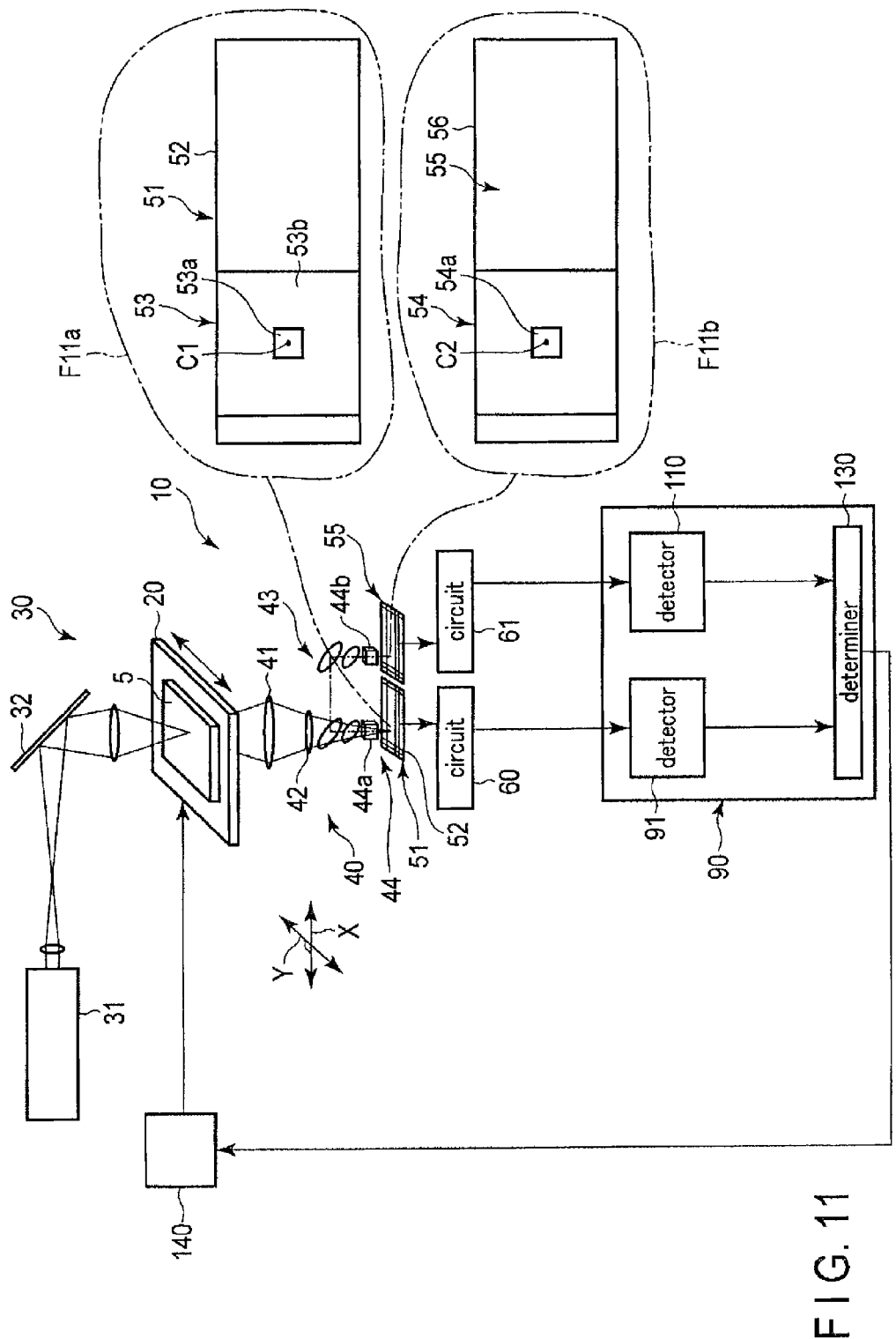
FIG. 11 is a schematic diagram showing a defect inspection apparatus according to a third embodiment.

FIG. 11 is a schematic diagram showing a defect inspection apparatus 10 according to the present embodiment. As shown in FIG. 11, in the present embodiment, the image conversion unit 50 uses the second storage-type sensor 55 in addition to the first storage-type sensor 51. The first storage-type sensor 51 and the second storage-type sensor 55 are the same type of storage-type sensor.

In the present embodiment, the laser light passing through the first optical path L1 is formed into an image in the sensor surface 52 of the first storage-type sensor 51, and the laser light passing through the second optical path L2 is formed into an image in a sensor surface 56 of the second storage-type sensor 55. Thus, in the present embodiment, the second range 54 is not formed in the sensor surface 52 of the first storage-type sensor 51, and the second range 54 is formed in the sensor surface 56 of the second storage-type sensor 55. The laser light passing through the second optical path L2 is formed into an image in the second range 54 of the sensor surface 56 of the second storage-type sensor 55. In the second storage-type sensor 55 as well, the optical axis of the second optical path L2 passes through the center C2 of the second range 54. The sensor surface 52 of the first storage-type sensor 51 indicating the first range 53 is shown in a zone 16a enclosed by a two-dot chain line in FIG. 11. A plan view of the sensor surface 56 of the second storage-type sensor 55 indicating the second range 54 is shown in a zone 16b enclosed by a two-dot chain line in FIG. 11.

FIG. 12 is a schematic diagram showing a part of the defect inspection apparatus 10 in which the first and second optical paths L1 and L2 are more specifically shown. As shown in FIG. 12, in the present embodiment, the optical path length adjuster 44 is different in the second plane parallel 44b from that in the first embodiment. The first plane parallel 44a is the same as that in the first embodiment. The focus F1 of the laser light passing through the first optical path L1 is provided on the first range 53. The second plane parallel 44b adjusts the optical path length of the second optical path L2 so that the focus F2 of the laser light passing through the second optical path L2 is formed before the sensor surface 56 of the second storage-type sensor 55 rather than on the sensor surface 56.

As the focus F2 of the laser light passing through the second optical path L2 is not located on the sensor surface 56 of the second storage-type sensor 55, an optical image formed in the first range 53 is different from an optical image formed in the second range 54. Therefore, the image data 71 and 72 are different from each other.

Figure 13:
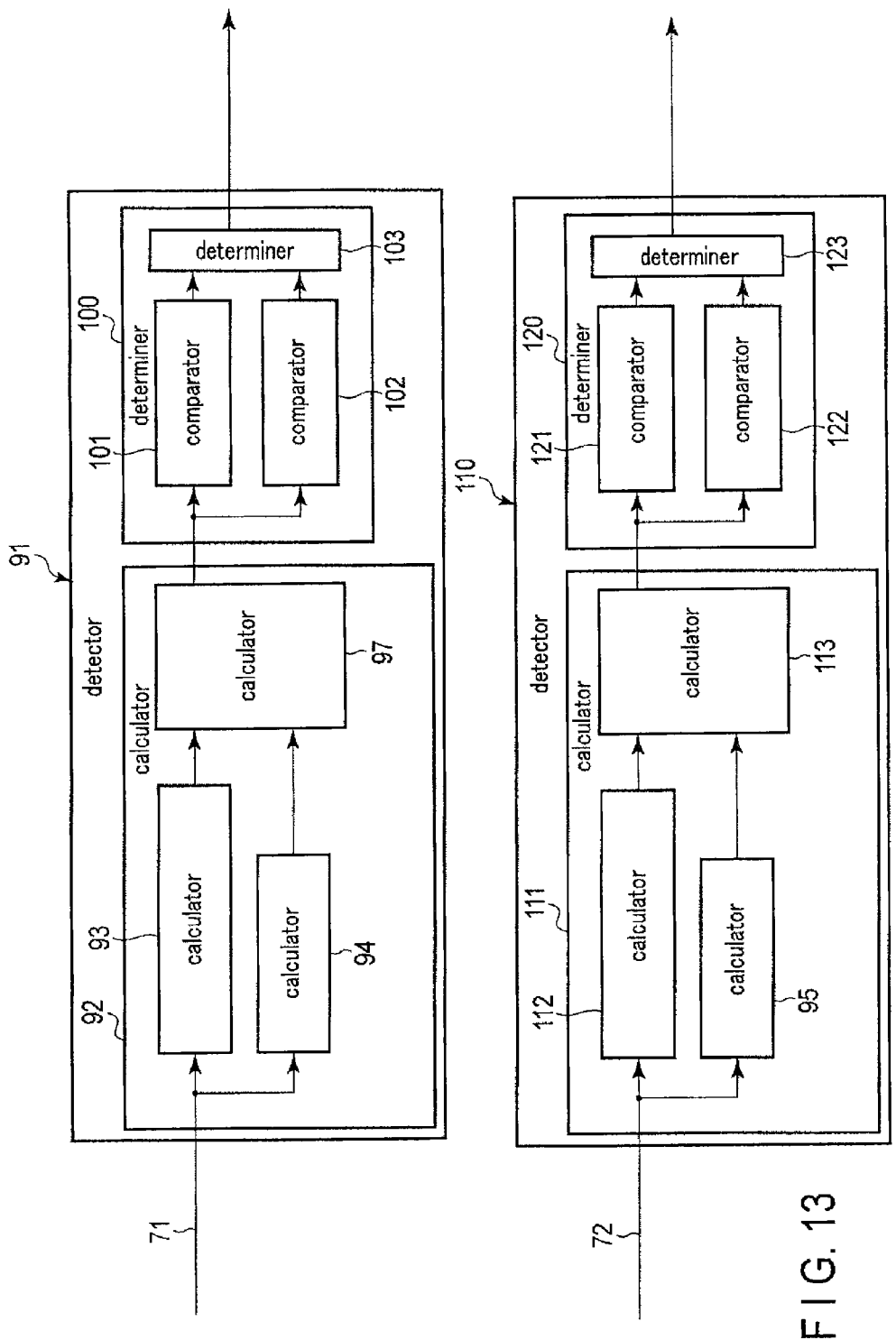
FIG. 13 is a block diagram showing first and second range singular part detecting circuits of the defect inspection apparatus.

FIG. 13 is a block diagram showing the first and second range singular part detectors 91 and 110 according to the present embodiment. As shown in FIG. 13, in the present embodiment, the first range singular part detector 91 does not have the second range peripheral region output level calculator 95 and the peripheral region output level average calculator 96. The second range singular part detector 110 does not have the first range peripheral region output level calculator 94 and the peripheral region output level average calculator 96.

The reasons for this are as follows. The focus F1 of the laser light passing through the first optical path L1 is located on the first range 53, and the focus F2 of the laser light passing through the second optical path L2 is not located on the second range 54. As a result, the image data 71 and 72 are different from each other. Therefore, when an average of the output levels of the peripheral regions 71b and 72b is calculated, the peripheral region 71b of the image data 71 cannot be combined with the peripheral region 72b of the image data 72.

In the present embodiment, if the first range singular part determiner 103 of the first range singular part detector 91 determines that a singular part is formed in the notice pixel 71a, or if the second range singular part determiner 123 of the second range singular part detector 110 determines that a singular part is formed in the notice pixel 72a, the defect determiner 130 determines that a defect is formed in the part of the glass substrate 5 corresponding to the centers 53a and 54a of the first and second ranges 53 and 54.

This is described in detail. As described above, the focus F1 of the laser light passing through the first optical path L1 is formed on the first range 53 of the sensor surface 52 of the first storage-type sensor 51, and the focus F2 of the laser light passing through the second optical path L2 is formed before the sensor surface 56 of the second storage-type sensor 55. Thus, the optical images formed in the first and second ranges 53 and 54 are different from each other, and the image data 71 and 72 are therefore different from each other.

On the other hand, in the case of a fine defect, how an optical image indicating the defect is formed on the sensor surface is changed by the shift of the focus position of the optical image from the sensor surface, and the image data indicating the defect varies. Therefore, when the focus of the optical image is formed on the sensor surface, the defect may be more easily recognized by the change of the focus position of the laser light on the sensor surface even if the recognition of the defect is difficult.

The second storage-type sensor 55 and the second optical path L2 are obtained by changing the position of the focus F1 of the laser light on the sensor surface 52 in the first storage-type sensor 51. That is, the optical path lengths of the first and second optical paths L1 and L2 up to the sensor surfaces 52 and 56 are different from each other. Thus, even if the first range singular part detector 91 cannot detect a defect as a singular part, the second range singular part detector 110 may detect the defect as a singular part. Alternatively, even if the second range singular part detector 110 cannot detect a defect as a singular part, the first range singular part detector 91 may detect the defect as a singular part.

Thus, if one of the first and second range singular part detectors 91 and 110 detects a singular part, the defect determiner 130 determines that a defect is formed in the position in the glass substrate 5 corresponding to the singular part, so that a defect can be accurately detected.

The first and second optical paths L1 and L2 in the present embodiment are an example of how the optical path lengths of the divided optical paths up to the sensor surfaces where the optical images are formed are different from each other. When the optical path lengths of three or more optical paths up to the sensor surfaces are different from each other, a singular part detector which converts the optical image to image data and which is similar to the first and second range singular part detectors 91 and 110 is provided for each optical path. If at least one of the singular part detectors provided for the respective optical paths detects a singular part, the defect determiner determines that a defect is formed in the part of the glass substrate 5 corresponding to the center of the image data.

In the present embodiment as well, predetermined regions may be set for the centers 71a and 72a, and singular parts in these predetermined regions may be detected, as in the second embodiment. The singular parts in the predetermined regions may also be used to detect defects.

For example, the first range singular part detector 91 also detects a singular part in the predetermined region set for the center 71a. In this case, the defect determiner 130 determines that the part of the glass substrate 5 corresponding to the center 72a is a defect at least when the first range singular part determiner 103 of the first range singular part detector 91 provided for the center 71a determines that the center 71a is a singular part, when the singular part determiner of the first range singular part detector 91 provided in the predetermined region set for the center 71a determines that a singular part is formed in the predetermined region, or when the second range singular part determiner 123 of the second range singular part detector 110 determines that the center 72a is a singular part.

Similarly, the second range singular part detector 110 also detects a singular part in the predetermined region set for the center 72a. In this case, the defect determiner 130 determines that the part of the glass substrate 5 corresponding to the center 71a is a defect at least when the second range singular part determiner 123 of the second range singular part detector 110 provided for the center 72a determines that the center 72a is a singular part, when the singular part determiner of the second range singular part detector 110 provided in the predetermined region set for the center 72a determines that a singular part is formed in the predetermined region, or when the singular part determiner 103 of the first range singular part detector 91 determines that the center 71a is a singular part. Thus, a defect in the glass substrate 5 can be more accurately detected.

Alternatively, both the first and second range singular part detectors 91 and 110 may detect singular parts in the predetermined regions set for the centers 71a and 72a, respectively. In this case, the defect determiner 130 determines that a defect is formed in the part of the glass substrate 5 corresponding to the centers 71a and 72a when at least one of the first range singular part determiners 103 provided in the first range singular part detector 91 for the center 71a or the predetermined regions detects a singular part or when at least one of the second range singular part determiners 123 provided in the second range singular part detector 110 for the center 72a or the predetermined region detects a singular part.

Thus, when all the optical path lengths of all the optical paths divided by the optical path dividing mechanism up to the sensor surface are different from each other, at least one of the singular part detectors provided for the respective optical paths may detect a singular part in the center of the image data and also detect singular parts in the predetermined regions set around the center. If one of the singular part detectors which only detect a singular part in the center detects a singular part or if one of the singular part detectors which detect singular parts in the predetermined regions as well as in the center detects a singular part, the defect determiner determines that the center of the image data is a defect.

Now, a defect inspection apparatus according to a fourth embodiment is described with reference to FIGS. 14 to 16. Components similar in function to those according to the first embodiment are indicated by the same reference numerals as those according to the first embodiment and are not described. In the present embodiment, the optical path dividing mechanism 43 divides an optical path into a third optical path L3 in addition to the first and second optical paths L1 and L2. As the optical path is divided into three parts, the defect inspection apparatus 10 is different from that in the first embodiment. The present embodiment is the same as the first embodiment in other respects. The differences are described.

Figure 14:
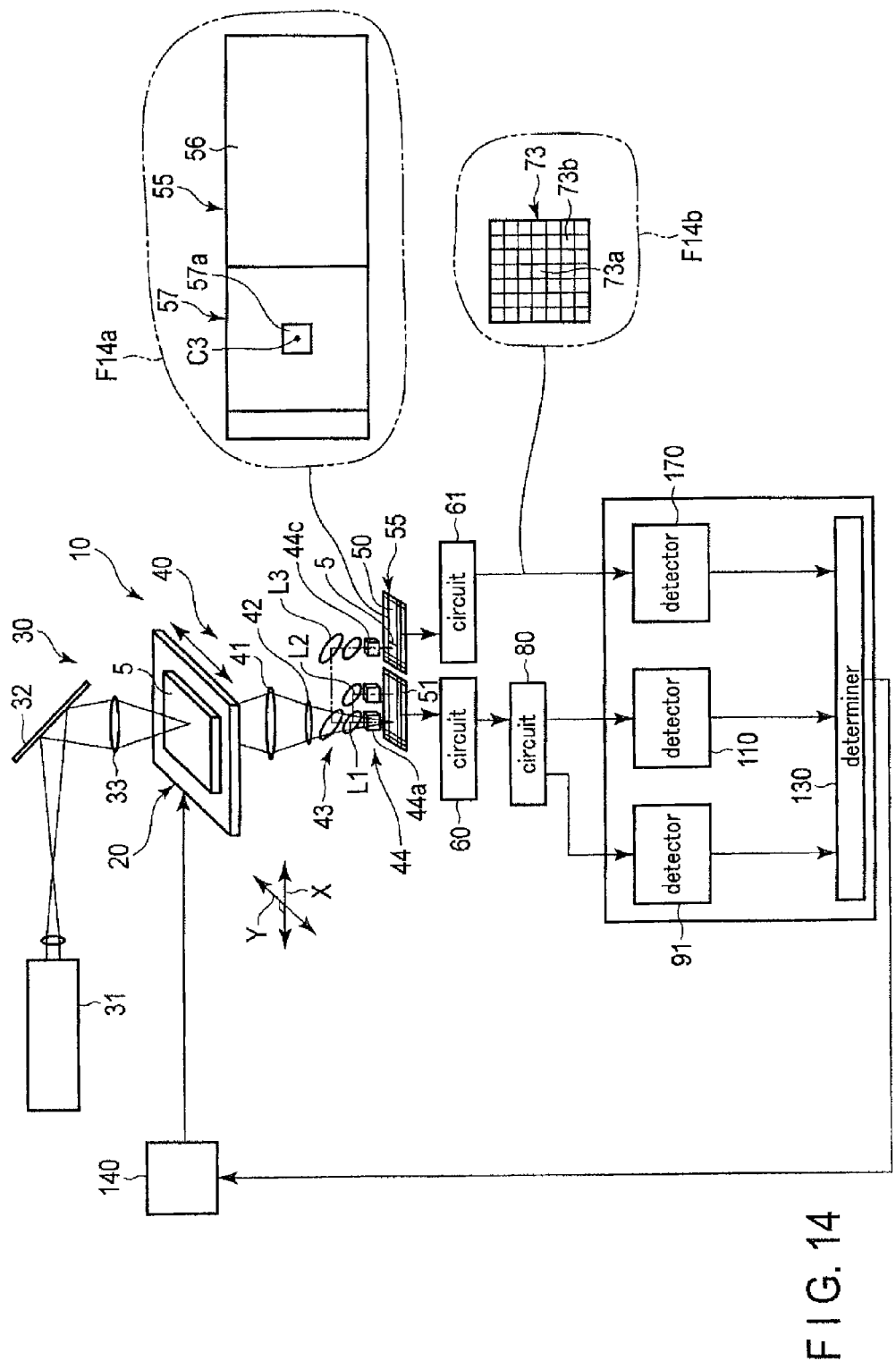
FIG. 14 is a schematic diagram showing a defect inspection apparatus according to a fourth embodiment.
Figure 15:
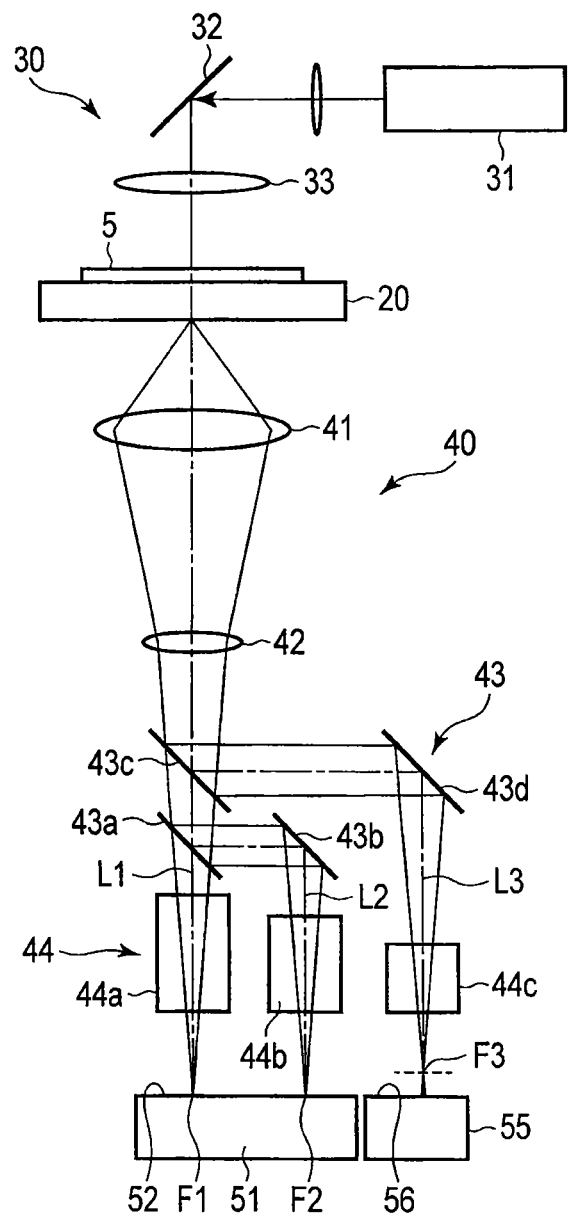
FIG. 15 is a schematic diagram showing a part of the defect inspection apparatus in which an optical path dividing mechanism is more specifically shown.

FIG. 14 is a schematic diagram showing the defect inspection apparatus 10 according to the present embodiment. FIG. 15 is a schematic diagram showing a part of the defect inspection apparatus 10 in which the optical path dividing mechanism 43 according to the present embodiment is more specifically shown. As shown in FIG. 14, the defect inspection apparatus 10 according to the present embodiment further comprises the second storage-type sensor 55, a second AD conversion circuit 61, and a third range singular part detector 170. As shown in FIG. 15, the optical path dividing mechanism 43 further comprises a second half mirror 43c and a second mirror 43d.

The second half mirror 43c is located closer to the glass substrate 5 than the first half mirror 43a on the optical path. The second half mirror 43c passes ⅔ of the laser light which has passed through the image formation lens 42, and reflects ⅓ of the laser light. The laser light which has passed through the second half mirror 43c reaches the first half mirror 43a. The second half mirror 43c reflects the laser light toward the second mirror 43d. The second mirror 43d reflects the laser light toward the second storage-type sensor 55. The optical path divided by the second half mirror 43c is the third optical path L3.

The optical path length adjuster 44 further comprises a third plane parallel 44c. The third plane parallel 44c is provided in the third optical path L3, and adjusts the optical path length of the third optical path L3 so that a focus F3 of the laser light passing through the third optical path L3 is formed before the sensor surface 56 of the second storage-type sensor 55.

Thus, in the present embodiment, the optical path length adjuster 44 equalizes the optical path lengths of the first and second optical paths L1 and L2 up to the sensor surface 52. The optical path length adjuster 44 also performs adjustment so that the optical path length of the third optical path L3 up to the sensor surface 56 is different from the optical path lengths of the first and second optical paths L1 and L2 up to the sensor surface 52.

A third range 57 in which the laser light passing through the third optical path L3 is formed into an image is formed on the sensor surface 56 of the second storage-type sensor 55. The third range 57 is equal in size and shape to the first and second ranges 53 and 54. The optical axis of the third optical path L3 passes through a center C3 of the third range 57. The third range 57 is equal in shape and size to the first and second ranges 53 and 54. The sensor surface 56 of the second storage-type sensor 55 and the third range 57 are shown in a zone 19a enclosed by a two-dot chain line in FIG. 14.

The second storage-type sensor 55 converts the optical image formed in the third range 57 to an electric signal. The second AD conversion circuit 61 converts the electric signal output by the second storage-type sensor 55 to image data. Image data 73 of the third range 57 is shown in a zone 14b enclosed by a two-dot chain line in FIG. 14. The image data 73 of the third range 57 is continuous image data obtained by the conversion of the optical image formed in the third range 57 to an electric signal by the storage-type sensor by the scanning of the XY stage.

Figure 16:
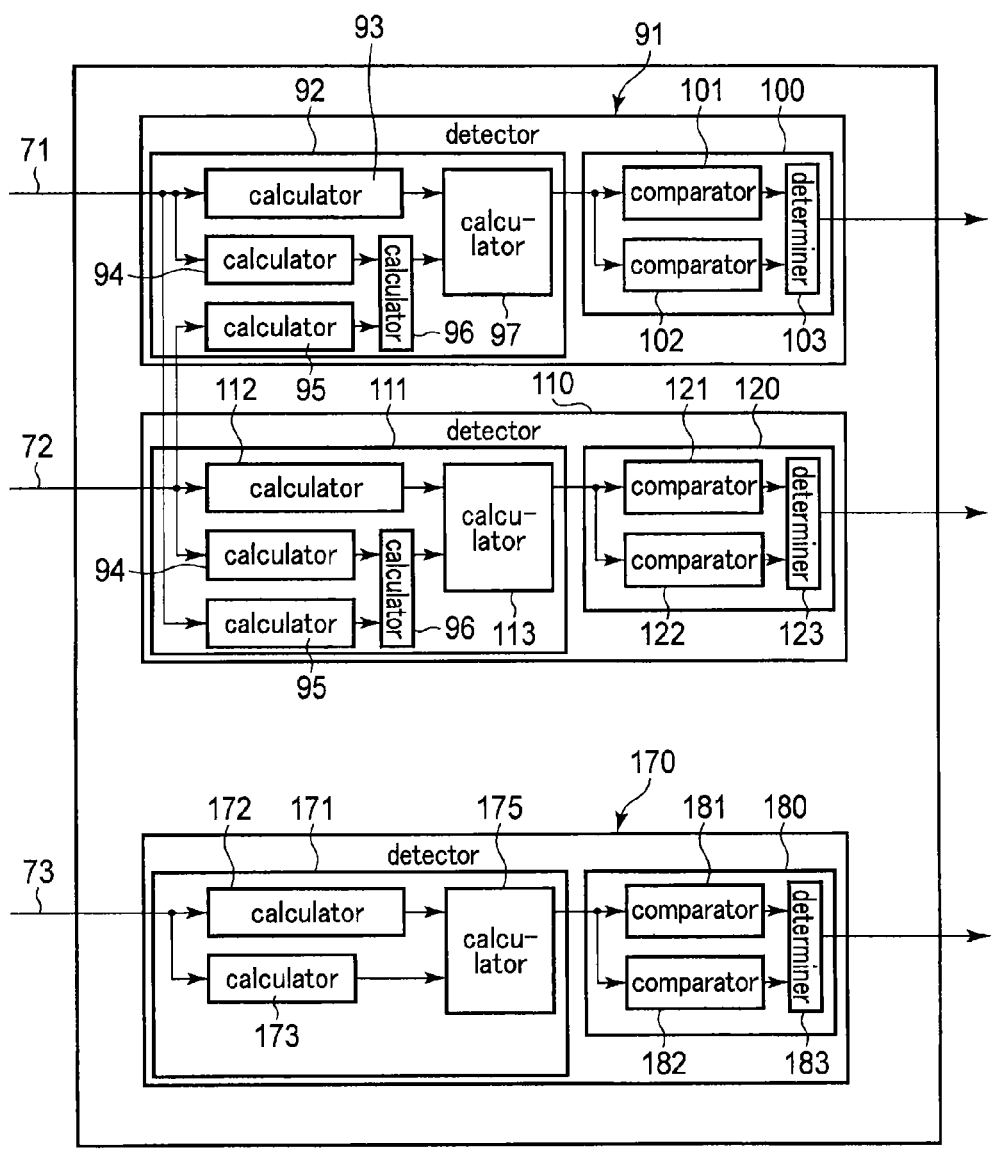
FIG. 16 is a block diagram showing a part of a defect determination circuit of the defect inspection apparatus.

FIG. 16 is a block diagram showing a part of the defect determination circuit 90. As shown in FIG. 16, the defect determination circuit 90 comprises the third range singular part detector 170. The third range singular part detector 170 is similar in configuration to the first and second range singular part detectors 91 and 110, and comprises a third range output displacement calculator 171 and a third range threshold determiner 180.

The third range output displacement calculator 171 calculates the difference between the output level of each pixel of the image data 73 and the output level of the peripheral region in order to determine whether each pixel contained in the image data 73 continuously obtained by changing the optical image on the third range 57 into image data is a singular part. In this case, each pixel of the image data is a notice pixel.

The third range output displacement calculator 171 comprises a third range center output level calculator 172, a third range peripheral region output level calculator 173, a peripheral region output level average calculator 174, and a third range output level difference calculator 175.

The image data 73 of the third range 57 is sent to the third range center output level calculator 172 from the second AD conversion circuit 61. The third range notice pixel output level calculator 172 calculates all pixels contained in the image data 73 flowing in the range 57 continuously, on the basis of the image data 73 of the third range 57.

The position, size, and shape of the center 57a relative to the third range 57 are the same as the position, size, and shape of the centers 53a and 54a relative to the first and second ranges 53 and 54. The center 57a of the third range 57 corresponds to one pixel in the image data 73, as in the case with the image data 71 and 72.

The center 73 of the third range 57 is sent to the third range peripheral region output level calculator 173 from the second AD conversion circuit 61. The third range peripheral region output level calculator 173 calculates the output level of a peripheral region 73b of the image data 73 corresponding to a peripheral region 57b of the third range 57 in the same manner as the first and second range peripheral region output level calculators 94 and 95. More specifically, the third range peripheral region output level calculator 173 calculates the average output level of pixels of the peripheral region 73b. The peripheral region 57b is the part of the third range 57 other than the center 57a.

The third range peripheral region output level calculator 173 sends the calculation result to the third range output level difference calculator 175.

The third range output level difference calculator 175 subtracts the calculation result by the third range peripheral region output level calculator 173 from the calculation result by the third range center output level calculator 172. The calculation result by the third range output level difference calculator 175 is sent to the third range threshold determiner 180.

The third range threshold determiner 180 compares the calculation result by the third range output level difference calculator with a threshold, and determines whether the notice pixel 73a is a singular part. The third range threshold determiner 180 comprises a first comparator 181, a second comparator 182, and a third range singular part determiner 183.

The calculation result by the third range output level difference calculator 175 is sent to the first comparator 181. The first comparator 181 determines whether the calculation result by the third range output level difference calculator 175 is more than the first threshold Lvl1. The calculation result by the third range output level difference calculator 175 is sent to the second comparator 182. The second comparator 182 determines whether the calculation result by the third range output level difference calculator 175 is less than the second threshold Lvl2.

The comparison results by the first and second comparators 181 and 182 are sent to the third range singular part determiner 183. The third range singular part determiner 183 determines that the notice pixel 73a of the image data 73 is a singular part when the comparison result by the first comparator 181 shows that the calculation result by the third range output level difference calculator 175 is more than the first threshold Lvl1 or when the comparison result by the second comparator 182 shows that the calculation result by the third range output level difference calculator 175 is less than the second threshold Lvl2. The determination result by the third range singular part determiner 183 is sent to the defect determiner 130.

In the present embodiment, the determination results by the first to third range singular part determiners 103, 123, and 183 are sent to the defect determiner 130. When both the first and second range singular part determiners 103 and 123 determine that the centers 71a and 72a of the image data 71 and 72 are singular parts, the defect determiner 130 determines that a defect is formed in the part of the glass substrate 5 corresponding to the centers 53a, 54a, and 57a of the first, second, and third ranges 53, 54, and 57. Alternatively, when the third range singular part determiner 183 determines that the notice pixel 73a of the image data 73 is a singular part, the defect determiner 130 determines that a defect is formed in the part of the glass substrate 5 corresponding to the centers 53a, 54a, and 57a of the first to third ranges 53, 54, and 57.

This is attributed to the fact that, as has been described in the second embodiment, the focus of the laser light passing through the third optical path L3 is formed before the sensor surface 56 of the second storage-type sensor 55 so that the optical images formed in the first and second ranges 53 and 54 are different from the optical image formed in the third range 57.

Thus, even if the first and second range singular part detectors 91 and 110 cannot detect a defect as a singular part, the third range singular part detector 170 may be able to detect the defect as a singular part. In contrast, even if the third range singular part detector 170 cannot detect a defect as a singular part, the first and second range singular part detectors 91 and 110 may be able to detect the defect as a singular part.

In the present embodiment, a defect in the glass substrate 5 can be accurately detected.

In the present embodiment, the optical path lengths of the first and second optical paths L1 and L2 up to the sensor surface are equal to each other, and the optical path length of the third optical path L3 is different from the optical path lengths of the first and second optical paths L1 and L2. This is an example of how the optical path dividing mechanism divides an optical path into three or more parts, a plurality of optical path lengths up to the sensor surface where the optical image is formed are set in the three or more optical paths, and at least two of the optical path lengths are equal to each other.

For example, when the optical path dividing mechanism divides an optical path into five parts, the optical path lengths of three of the five optical paths up to the sensor surface may be equal to each other, and the optical path lengths of the remaining two optical paths may be different from each other and different from the optical path lengths of the three optical paths. A defect detector which converts the optical image to image data and which is similar to the first to third range singular part detectors 91, 110, and 170 is provided for each optical path. The defect determiner 130 determines that a defect is formed in the part of the glass substrate 5 corresponding to the center of the image data when all the singular part detectors provided in the respective optical paths of the group having three optical paths equal in optical path length detect singular parts or when one of the singular part detectors provided for the remaining two optical paths detects a singular part.

Thus, when there are a plurality of groups each having optical paths equal in the optical path length up to the sensor surface, the defect determiner determines that a defect is formed in the part of the glass substrate 5 corresponding to the center of the image data if all the singular part detectors provided in the optical paths that constitute at least one of the groups detect singular parts. In addition, when there are a plurality of optical paths different in optical path length from other optical paths, the defect determiner determines that a defect is formed in the part of the glass substrate 5 corresponding to the center of the image data even if at least one of the singular part detectors provided in the optical paths detects a singular part.

In the present embodiment as well, at least one of the first to third range singular part detectors 91, 110, and 170 may detect singular parts in predetermined regions 53b, 54b, and 57b set around the centers 53a, 54a, and 57a of the first, second, and third ranges 53, 54, and 57, as in the second and third embodiments.

For example, the first range singular part detector 91 detects singular parts in the predetermined regions set for the center 71a as well as in the center 71a. In this case, the defect determiner determines that a defect is formed in the part of the glass substrate 5 corresponding to the centers 71a, 72a, and 73a when at least one of the first range singular part determiners 103 provided in the first range singular part detector 91 for the center 71a or the predetermined region detects a singular part and when the second range singular part determiner 123 of the second range singular part detector 110 detects a singular part. Alternatively, when the third range singular part detector 170 detects a defect, the defect determiner 130 determines that a defect is formed in the part of the glass substrate 5 corresponding to the centers 71a, 72a, and 73a.

Similarly, the second range singular part detector 110 detects singular parts in the predetermined regions as well as in the center 72a. In this case, the defect determiner determines that a defect is formed in the part of the glass substrate 5 corresponding to the centers 71a, 72a, and 73a when at least one of the singular part determiners 123 provided in the second range singular part detector 110 for the center 72a or the predetermined region detects a singular part and when the first range singular part determiner 103 of the first range singular part detector 91 detects a singular part. Alternatively, when the third range singular part detector 170 detects a defect, the defect determiner 130 determines that a defect is formed in the part of the glass substrate 5 corresponding to the centers 71a, 72a, and 73a.

Thus, the optical path dividing mechanism divides an optical path into three or more parts, more than one kind of optical path length up to the sensor surface where the optical image is formed is set in the three or more optical paths, and the optical path lengths of at least two of the optical paths are equal to each other. In this case, a singular part detector which converts the optical image to image data and which is similar to the first to third singular part detectors 91, 110, and 170 is provided for each optical path. If the singular part detector provided for one optical path in at least one combination of the optical paths equal in the optical path length up to the sensor surface detects a singular part and if the singular part detectors provided for the remaining optical paths detect singular parts in the predetermined regions set for the position corresponding to the singular part in the image data, the defect determiner 130 determines that the singular parts are defects. Alternatively, there is an optical path different in optical path length from other optical paths. In this case, if the singular part detector provided for this optical path detects a singular part, the defect determiner 130 determines that the singular part is a defect.

Now, a defect inspection apparatus according to a fifth embodiment is described with reference to FIGS. 17 to 20. Components similar in function to those according to the fourth embodiment are indicated by the same reference numerals as those according to the first embodiment and are not described. In the present embodiment, the optical path dividing mechanism 43 further divides a fourth optical path L4. As the fourth optical path L4 is provided, the defect inspection apparatus 10 is different in configuration from that in the fourth embodiment. The differences are described.

FIG. 17 is a schematic diagram showing the defect inspection apparatus 10 according to the present embodiment. As shown in FIG. 17, in the present embodiment, the defect inspection apparatus 10 further comprises a second distribution circuit 81 and a fourth range singular part detector 190.

Figure 18:
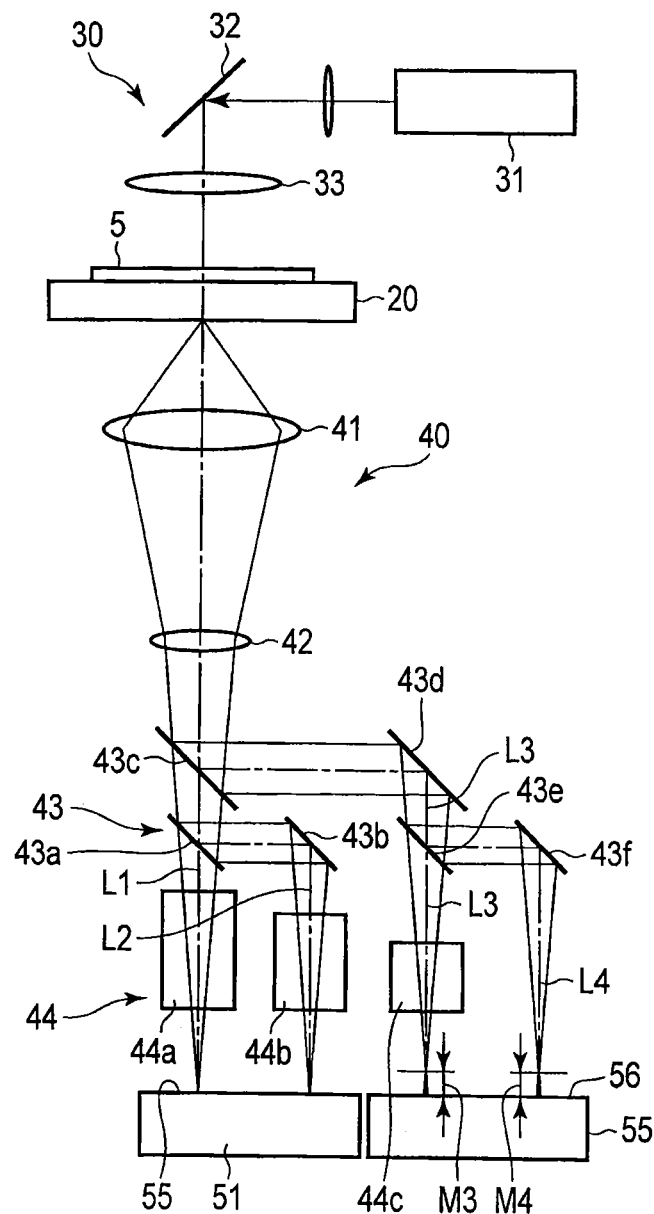
FIG. 18 is a schematic diagram showing a part of the defect inspection apparatus in which optical paths are specifically shown.

FIG. 18 is a schematic diagram showing a part of the defect inspection apparatus 10 in which paths are specifically shown. As shown in FIG. 18, the optical path dividing mechanism 43 further comprises a third half mirror 43e and a third mirror 43f. The third half mirror 43e is provided in the third optical path L3. In the present embodiment, the second half mirror 43c passes 50 percent of laser light, and reflects 50 percent of the laser light toward the second mirror 43d.

The third half mirror 43e passes 50 percent of laser light, and reflects 50 percent of the laser light toward the third mirror 43f. The third mirror 43f reflects the laser light toward the sensor surface 56 of the second storage-type sensor 55. The laser light is reflected by the third half mirror 43e, and the fourth optical path L4 is divided. In addition to the third range 57, a fourth range 58 in which the laser light passing through the fourth optical path L4 is formed into an image is formed on the sensor surface 56 of the second storage-type sensor 55.

Figure 19:
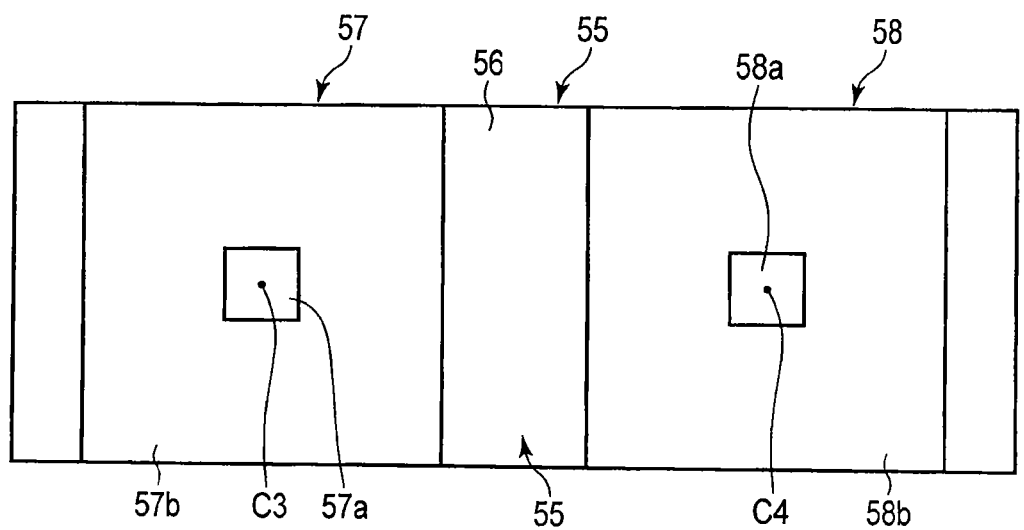
FIG. 19 is a plan view showing a sensor surface of a second storage-type sensor of the defect inspection apparatus.

FIG. 19 shows the sensor surface 56 of the second storage-type sensor 55. As shown in FIG. 19, the fourth range 58 is equal in size and shape to the first to third ranges 53, 54, and 57. The optical axis of the fourth optical path L4 passes through a center C4 of the fourth range 58. The position, size, and shape of a center 58a relative to the fourth range 58 are the same as the positions, sizes, and shapes of the centers 53a, 54a, and 57a relative to the first to third ranges 53, 54, and 57. The center 58a is similar to the centers 53a, 54a, and 57a of the first, second, and third ranges 53, 54, and 57.

As shown in FIG. 18, a focus F4 of the laser light passing through the fourth optical path L4 is in the same position as the focus F3 of the laser light passing through the third optical path L3. The same position referred to here means that the focuses F3 and F4 are at an equal distance from the sensor surface 56 of the second storage-type sensor 55. That is, a distance M3 from the sensor surface 56 to the focus F3 along the third optical path L3 is the same as a distance M4 from the sensor surface 56 to the focus F4 along the fourth optical path L4. In the present embodiment, even if no plane parallel for optical path length adjustment is provided on the fourth optical path L4, the focuses F3 and F4 of the laser light beams passing through the third and fourth optical paths L3 and L4 are located in the same position. Thus, no plane parallel is provided on the fourth optical path L4. Otherwise, a device capable of optical path length adjustment in the same manner as the plane parallel may be provided in the fourth optical path L4.

As shown in FIG. 17, the fourth range 58 of the second storage-type sensor 55 converts the optical image formed in the fourth range 58 to an electric signal. The second AD conversion circuit 61 converts the optical images formed in the third and fourth ranges 57 and 58 to image data.

The second distribution circuit 81 distributes the image data formed by the second AD conversion circuit 61 into the image data 73 of the third range 57 and image data 74 of the fourth range 58, and sends the image data 73 and 74 of the third and fourth ranges 57 and 58 to the third and fourth range singular part detectors 170 and 190. The image data 74 of the fourth range 58 is continuous image data obtained by the conversion of the optical image formed in the fourth range 58 to an electric signal by the storage-type sensor by the scanning of the XY stage.

FIG. 20 is a block diagram showing a part of the defect determination circuit 90. As shown in FIG. 20, the defect determination circuit 90 according to the present embodiment further comprises the fourth range singular part detector 190. In the present embodiment, the third range singular part detector 170 further comprises a fourth range peripheral region output level calculator 194 and the peripheral region output level average calculator 174. The image data 74 of the fourth range 58 is sent to the fourth range peripheral region output level calculator 194. In the same manner as the third range peripheral region output level calculator 173, the fourth range peripheral region output level calculator 194 calculates the output level of a peripheral region 74b of the image data 74 corresponding to a peripheral region 58b of the fourth range 58. The calculation result by the fourth range peripheral region output level calculator 194 is sent to the peripheral region output level average calculator 174.

In the present embodiment, in the same manner as the first range singular part detector 91, the peripheral region output level average calculator 174 calculates an average of the calculation result by the third range peripheral region output level calculator 173 and the calculation result by the fourth range peripheral region output level calculator 194.

The fourth range singular part detector 190 comprises a fourth range output displacement calculator 191 and a fourth range threshold determiner 200.

The fourth range output displacement calculator 191 calculates the difference between the output level of each pixel of the image data 74 and the output level of the peripheral region in order to determine whether each pixel contained in the image data 74 continuously obtained by changing the optical image on the fourth range 58 into image data is a singular part. In this case, each pixel of the image data is a notice pixel.

The fourth range output displacement calculator 191 comprises a fourth range notice pixel output level calculator 192, a third range peripheral region output level calculator 173, a fourth range peripheral region output level calculator 194, a peripheral region output level average calculator 174, and a fourth range output level difference calculator 195.

The image data 74 of the fourth range 58 is sent to the fourth range notice pixel output level calculator 192. The fourth range center output level calculator 192 calculates the output level of the all pixels contained in the fourth range 58 continuously flow in the forth range 58.

The third range peripheral region output level calculator 173 and the fourth range peripheral region output level calculator 194 are the same as the third range peripheral region output level calculator 173 and the fourth range peripheral region output level calculator 194 of the aforementioned third range output displacement calculator 171.

As described above, fourth the peripheral region output level average calculator 174 calculates the average value of the calculation results by the third range peripheral region output level calculator 173 and calculation results the fourth range peripheral region output level calculator 194.

The calculation result by the fourth range notice pixel output level calculator 192 and the calculation result by the peripheral region output level average calculator 174 are sent to the fourth range output level difference calculator 195. The fourth range output level difference calculator 195 subtracts the calculation result by the peripheral region output level average calculator 174 from the calculation result by the fourth range notice pixel output level calculator 192.

The fourth range threshold determiner 200 compares the calculation result by the fourth range output level difference calculator 195 with a threshold, and determines whether the center 74a of the image data 74 is a singular part. The fourth range threshold determiner 200 comprises a first comparator 201, a second comparator 202, and a singular part determiner 203.

The calculation result by the fourth range output level difference calculator 195 is sent to the first comparator 201. The first comparator 201 determines whether the calculation result by the fourth range output level difference calculator 195 is more than the first threshold Lvl1. The calculation result by the fourth range output level difference calculator 195 is sent to the second comparator 202. The second comparator 202 determines whether the calculation result by the fourth range output level difference calculator 195 is less than the second threshold Lvl2.

The comparison results by the first and second comparators 201 and 202 are sent to the singular part determiner 203. The singular part determiner 203 determines that the center 74*a* of the image data 74 is a singular part when the comparison result by the first comparator 201 shows that the calculation result by the fourth range output level difference calculator 195 is more than the first threshold Lvl1 or when the comparison result by the second comparator 202 shows that the calculation result by the fourth range output level, difference calculator 195 is less than the second threshold Lvl2.

As shown in FIG. 17, in the present embodiment, the determination results by the first to fourth range singular part determiners 103, 123, 183, and 203 are sent to the defect determiner 130. When both the first and second range singular part detectors 91 and 110 detect that the notice pixel 71*a* and 72*a* of the image data 71 and 72 are singular parts, or when both the third and fourth range singular part detectors 170 and 190 detect that the centers 73*a* and 74*a* of the image data 73 and 74 are singular parts, the defect determiner 130 determines that a defect is formed in the position in the glass substrate 5 corresponding to the centers 53*a*, 54*a*, 57*a*, and 58*a* of the first to fourth ranges 53, 54, 57, and 58.

In the present embodiment, a defect in the glass substrate 5 can be accurately detected, as in the first and second embodiments.

This is attributed to the following fact. As has been described in the second embodiment, the optical images formed in the first and second ranges 53 and 54 of the first storage-type sensor 51 are the same, and the optical images formed in the third and fourth ranges 57 and 58 of the second storage-type sensor 55 are the same. The correlation between the positions of the focuses F1 and F2 of the first and second optical paths L1 and L2 with the sensor surface 52 of the first storage-type sensor 51 is different from the correlation between the positions of the focuses F3 and F4 of the third and fourth optical paths L3 and L4 with the sensor surface 56 of the second storage-type sensor 55. Thus, the optical images formed in the first and second ranges 53 and 54 are different from the optical images formed in the third and fourth ranges 57 and 58.

That is, when one of the image data for the optical images different in focus position detects a singular part, this singular part is determined to be a singular part, and a defect can thereby be accurately detected.

The first to fourth optical paths L1 to L4 are classified into a group of the first and second optical paths L1 and L2 and a group of the third and fourth optical paths L3 and L4. The position of the focus relative to the sensor surface is the same in each group. This relative position varies with the group. Thus, if singular parts are not formed in all the image data for the optical images formed by the optical paths that constitute each group, a singular part is not determined to be a defect. As a result, a defect can be more accurately detected.

In the present embodiment as well, the first to fourth range output displacement calculators may set predetermined regions in the notice pixel 71*a*, 72*a*, 73*a*, and 74*a*, and detect singular parts in these set regions, as in the second embodiment. The singular parts in the predetermined regions may also be used to detect defects.

Now, a defect inspection apparatus according to a sixth embodiment is described with reference to FIGS. 8 to 10 and 21 to 23. Components similar in function to those according to the fifth embodiment are indicated by the same reference numerals as those according to the fifth embodiment and are not described. The present embodiment is different from the fifth embodiment in that, as in the second embodiment, the second range singular part detector 110 and the fourth range singular part detector 190 determine whether the centers 72*a* and 74*a* are singular parts and in that whether the predetermined regions set for the centers 72*a* and 74*a* are singular parts is determined. In accordance with these differences, the configuration of the defect inspection apparatus 10 is different. The differences are described.

In the present embodiment, as in the second embodiment, the second range singular part detector 110 detects whether the center 72*a* of the image data 72 is a singular part, and also determines whether the predetermined region 72*c* set for the center 72*a* of the image data 72 is a singular part. Therefore, as shown in FIG. 8, the second range singular part detector 110 is the same as that in the second embodiment. That is, whether the first to eighth images 141 to 148 indicating the predetermined region 72*c* in the image data 72 are singular parts is determined.

As shown in FIG. 9, the predetermined region 54*c* is set in the second range 54, as in the second embodiment. As shown in FIG. 10, the predetermined region 72*c* is set in the image data 72, as in the second embodiment.

Figure 21:
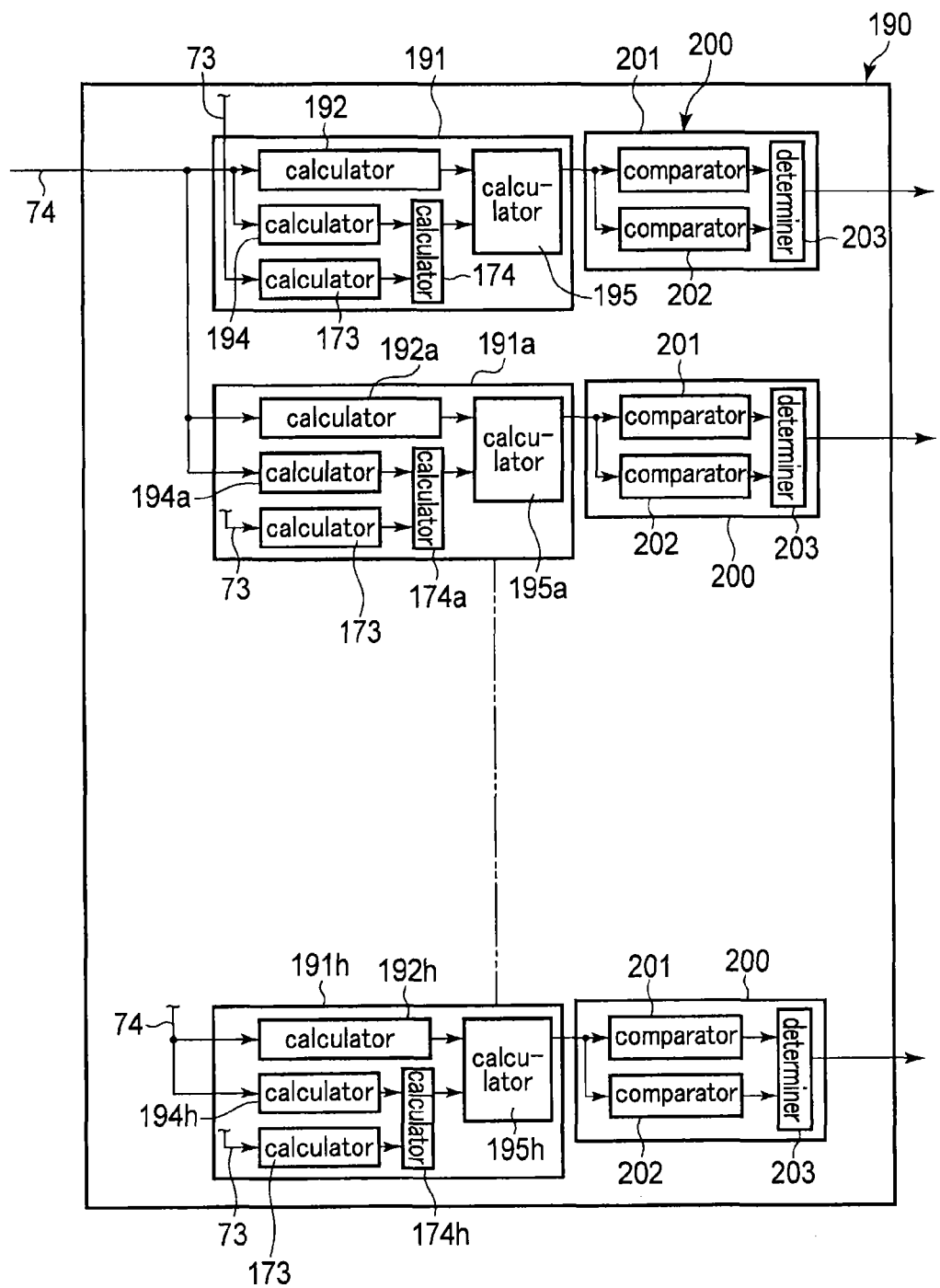
FIG. 21 is a block diagram showing a fourth range singular part detecting circuit of the defect inspection apparatus according to the fourth embodiment.

FIG. 21 shows the fourth range singular part detector 190 according to the present embodiment. In the same manner as the second range singular part detector 110, the fourth range singular part detector 190 determines whether the center 74*a* of the image data 74 is a singular part, and also determines whether a predetermined region 74*c* set for the center 74*a* is a singular part.

Figure 22:
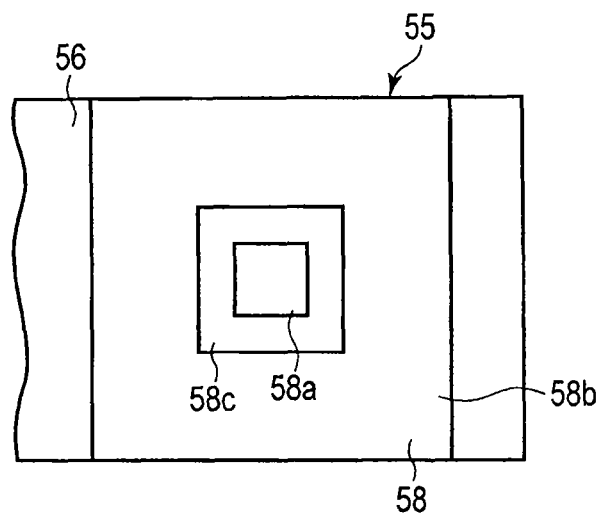
FIG. 22 is a plan view showing a part located in the vicinity of a fourth range in the sensor surface of the second storage-type sensor of the defect inspection apparatus.

FIG. 22 is a plan view showing a part located in the vicinity of the fourth range 58 in the sensor surface 56 of the second storage-type sensor 55 according to the present embodiment. As shown in FIG. 22, a predetermined region 58*c* is set in the fourth range 58. The position, shape, and size of the predetermined region 58*c* relative to the fourth range 58 are the same as the position, shape, and size of the predetermined region 54*c* relative to the second range 54. The predetermined region 58*c* is a part of the peripheral region 58*b*.

Figure 23:
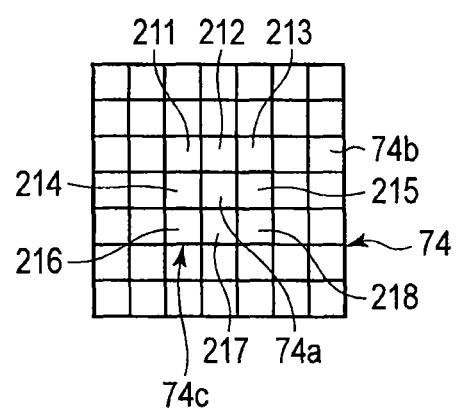
FIG. 23 is a diagram showing image data for the fourth range.

FIG. 23 shows the image data 74. As shown in FIG. 23, the predetermined region 74*c* for the predetermined region 58*c* is set in the image data 74. The predetermined region 74*c* is indicated by eight pixels around the center 74*a*. The pixels indicating the predetermined region 74*c* are first to eighth pixels 211, 212, 213, 214, 215, 216, 217, and 218.

As shown in FIG. 21, the fourth range singular part detector 190 is similar in configuration to the second range singular part detector 110 according to the present embodiment. That is, in addition to the fourth range output displacement calculator 191 for detecting whether the center 74*a* is a singular part, the fourth range singular part detector 190 comprises fourth range output displacement calculators 191*a*, 191*b*, 191*c*, 191*d*, 191*e*, 191*f*, 191*g*, and 191*h* for determining whether the first to eighth pixels 211 to 218 are singular parts, and a threshold determiner 200. In FIG. 21, the fourth range output displacement calculators 191, 191*a*, and 191*h* are shown, and the fourth range output displacement calculators 191*b* to 191*g* are not shown.

The fourth range output displacement calculators 191*a*, 191*b*, 191*c*, 191*d*, 191*e*, 191*f*, 191*g*, and 191*h* are similar to the second range output displacement calculators 111*a* to 111*h*.

A concrete explanation is given. The fourth range output displacement calculator 191*a* and the fourth range threshold determiner 200 are used to detect whether the first pixel 211 is a singular part. The fourth range output displacement calculator 191*b* and the fourth range threshold determiner 200 are used to detect whether the second pixel 212 is a singular part. The fourth range output displacement calculator 191*c* and the second range threshold determiner 120 are used to detect whether the third pixel 213 is a singular part. The fourth range output displacement calculator 191*d* and the fourth range threshold determiner 200 are used to detect whether the fourth pixel 214 is a singular part. The fourth range output displacement calculator 191*e* and the fourth range threshold determiner 200 are used to detect whether the fifth pixel 215 is a singular part. The fourth range output displacement calculator 191*f* and the fourth range threshold determiner 200 are used to detect whether the sixth pixel 216 is a singular part. The fourth range output displacement calculator 191*g* and the fourth range threshold determiner 200 are used to detect whether the seventh pixel 217 is a singular part. The fourth range output displacement calculator 191*h* and the fourth range threshold determiner 200 are used to detect whether the eighth pixel 218 is a singular part.

Among the fourth range output displacement calculators 191*a* to 191*h* and the fourth range threshold determiner 200 used for the first to eighth pixels 211 to 218, the fourth range output displacement calculator 191*a* and the fourth range threshold determiner 200 used for the first pixel 211 are described by way of example.

As shown in FIG. 21, the fourth range output displacement calculator 191*a* used for the first pixel 211 comprises a first pixel output level calculator 192*a* instead of the fourth range notice pixel output level calculator 192. The image data 74 of the fourth range 58 is sent to the first pixel output level calculator 192*a*. The first pixel output level calculator 192*a* calculates an output level of the first pixel 211, on the basis of the image data 74 of the fourth range 58.

The fourth range output displacement calculator 191*a* comprises a fourth range peripheral region output level calculator 194*a* instead of the fourth range peripheral region output level calculator 194. The image data 74 is sent to the fourth range peripheral region output level calculator 194*a*. The fourth range peripheral region output level calculator 194*a* regards parts of the image data 74 other than the first pixel 211 as peripheral regions, and calculates and adds up the output levels of the pixels other than the first pixel 211. The third range peripheral region output level calculator 173 is the same as that in the fifth embodiment.

The fourth range output displacement calculator 191*a* comprises a peripheral region output level average calculator 174*a* instead of the peripheral region output level average calculator 174. The calculation result by the fourth range peripheral region output level calculator 194*a* and the calculation result by the third range peripheral region output level calculator 173 are sent to the peripheral region output level average calculator 174*a*. The peripheral region output level average calculator 174*a* adds up the calculation results by the third and fourth range peripheral region output level calculators 173 and 194*a*. The obtained additional value is divided by the number of pixels indicating the parts of the image data 74 other than the first pixel 211 and indicating the peripheral region 73*b*. The number of pixels indicating the center 74*a* is integrated with the obtained divisional value.

This integration value indicates the average of the output levels from the range of the same size as the center 74*a* in the combination of the parts of the image data 74 other than the first pixel 211 and the peripheral region 73*b*. In the present embodiment, the center 74*a* is represented by one pixel, so that the aforementioned divisional value is the average of the output levels of the peripheral regions.

The fourth range output displacement calculator 191*a* comprises a fourth range output level difference calculator 195*a* instead of the fourth range output level difference calculator 195. The fourth range output level difference calculator 195*a* subtracts the calculation result by the peripheral region output level average calculator 174*a* from the calculation result by the first pixel output level calculator 192*a*. The calculation result by the fourth range output level difference calculator 195*a* is sent to the fourth range threshold determiner 200.

The fourth range threshold determiner 200 is the same as that in the fifth embodiment. The first comparator 201 determines whether the calculation result by the fourth range output level difference calculator 195*a* is more than the first threshold Lvl1. The second comparator 202 determines whether the calculation result by the fourth range output level difference calculator 195*a* is less than the second threshold Lvl2.

Thus, the fourth range output displacement calculator 191*a* for the first pixel 211 is substantially similar to the fourth range output displacement calculator 191 described in the fifth embodiment. One difference therebetween is that the data for the first pixel 211 is used instead of the data for the center 74*a* for the processing in the fourth range output displacement calculator 191. Another difference therebetween is that the data for parts other the first pixel 211 is used instead of the data for the peripheral region 74*b*.

The fourth range output displacement calculators 191*b* to 191*h* used for the second to eighth pixels 212 to 218 are also similar to the fourth range output displacement calculator 191*a*. More specifically, each of the fourth range output displacement calculators 191*b* to 191*h* is substantially similar to the fourth range output displacement calculator 191 described in the fifth embodiment. One difference is that the data for the second to eighth pixels 212 to 218 are used instead of the data for the center 74*a* used in the fourth range output displacement calculator 191. Another difference is that the data for parts other the second to eighth pixels 212 to 218 are used instead of the data for the peripheral region 74*b*.

In FIG. 21, the fourth range output displacement calculators 191, 191*a*, and 191*h* are shown, and 191*b* to 191*g* are not shown. The fourth range output displacement calculator 191*h* comprises an eighth pixel output level calculator 192*h*, a fourth range peripheral region output level calculator 194*h*, and an output level average calculator 174*h*. Thus, each of the fourth range output displacement calculators 191*b* to 191*g* has a corresponding one of the output level calculators 192*b* to 192*g* for calculating the output levels of the corresponding pixels of one of the second to seventh pixels 212 to 217, a corresponding one of the fourth range peripheral region output level calculators 194*b* to 194*g*, a corresponding one of the output level average calculators 174*b* to 174*g*, and a corresponding one of the fourth range output level difference calculators 195*b* to 195*g*.

The detection result by the first range singular part detector 91, the determination result by the singular part determiner 123 of the second range singular part detector 110 set for the center 72a and the first to eighth pixels 141 to 148, the detection result by the third range singular part detector 170, and the determination result by the singular part determiner 123 of the fourth range singular part detector 190 set for the center 74a and the first to eighth pixels 211 to 218 are sent to the defect determiner 130.

In the present embodiment, if the first range singular part determiner 103 determines that the center 71a is a singular part and if a singular part is detected in the detection result by the second range singular part determiner 123 provided for the center 72a or in the detection results by the second range singular part determiners 123 provided for the first to eighth pixels 141 to 148, the defect determiner 130 determines that the singular parts are defects. Alternatively, if the third range singular part determiner 183 determines that the center 73a is a singular part and if a singular part is detected in the detection result by the fourth range singular part determiner 203 provided for the center 74a or in the detection result by the fourth range singular part determiners 203 provided for the first to eighth pixels 211 to 218, the defect determiner 130 determines that the singular parts are defects.

In the present embodiment, a defect in the glass substrate 5 can be accurately determined. Moreover, singular parts in the predetermined regions 72c and 74c of the image data 72 and 74 of the second and fourth ranges 54 and 58 are detected, and this detection result is used to determine a defect. Thus, a defect in the glass substrate 5 can be more accurately determined.

In the first to sixth embodiments, the glass substrate 5 is an example of a subject. In the first to sixth embodiments, the illumination optical system 30 is an example of an illumination optical system which illuminates a subject. In the first and second embodiments, the image formation unit 40 is an example of an image formation optical system. The image formation optical system comprises an optical path dividing mechanism which divides, into first and second optical paths, light originating from the illumination optical system that has passed through or has been reflected by the subject. The image formation optical system forms an optical image derived from light passing through the first optical path, and an optical image derived from light passing through the second optical path. The above optical images are optical images of the same part of the subject. In the first and second embodiments, the optical path dividing mechanism 43 is an example of an optical path dividing mechanism. In the first and second embodiments, the image conversion unit 50 is an example of an image data conversion unit which converts, to image data, each of the optical images derived from the light beams passing through the first and second optical paths. In the first and second embodiments, the first and second range singular part detectors 91 and 110 are an example of a singular part detecting circuit which detects a singular part relative to its periphery in each of the image data. In the first and second embodiments, the optical path length adjuster 44 is an example of an optical path length adjusting mechanism which equalizes the optical path lengths of the first and second optical paths up to an imaging surface of the image data conversion unit. In the first and second embodiments, the defect determiner 130 is an example of a defect determining unit which determines a defect on the basis of singular part detection results of the two image data by the singular part detecting circuit.

In the first to sixth embodiments, the optical path length adjuster 44 of the image formation unit 40 is configured to divide the light which has passed through the glass substrate 5 into a plurality of optical paths. Otherwise, the image formation unit 40 may apply the laser light to the glass substrate 5, divide the reflected light into a plurality of optical paths, and form an optical image.

In the fifth and sixth embodiments, the image formation unit 40 is an example of an image formation optical system. The image formation optical system comprises an optical path dividing mechanism which divides, into first to fourth optical paths, light originating from the illumination optical system that has passed through or has been reflected by the subject. The image formation optical system forms an optical image derived from light passing through the first optical path, an optical image derived from light passing through the second optical path, an optical image derived from light passing through the third optical path, and an optical image derived from light passing through the fourth optical path. The above optical images are optical images of the same part of the subject. In the fifth and sixth embodiments, the optical path dividing mechanism 43 is an example of an optical path dividing mechanism. In the fifth and sixth embodiments, the image conversion unit 50 is an example of an image data conversion unit which converts, to image data, each of the optical images derived from the light beams passing through the first to fourth optical paths. In the fifth and sixth embodiments, the first to fourth range singular part detectors 91, 110, 170 and, 190 are an example of a singular part detecting circuit which detects a singular part relative to its periphery in each of the image data. In the fifth and sixth embodiments, the optical path length adjuster 44 is an example of an optical path length adjusting mechanism. The optical path length adjusting mechanism equalizes the optical path lengths of the first and second optical paths up to an imaging surface of the image data conversion unit, and equalizes the optical path lengths of the third and fourth optical paths up to the imaging surface of the image data conversion unit. The optical path length adjusting mechanism shifts the focus positions of the light beams passing through the third and fourth optical paths relative to the imaging surface. In the fifth and sixth embodiments, the defect determiner 130 is an example of a defect determining unit which determines a defect on the basis of singular part detection results of the four image data by the singular part detecting circuit.

In the first to sixth embodiments, the first and second storage-type sensors 51 and 55 are used as parts of the image data conversion unit. Otherwise, an area sensor of a CCD may be used to convert an optical image to an electric signal.

In the first to sixth embodiments, by way of example, the defect inspection apparatus inspects a pattern formed on the glass substrate 5. Otherwise, the defect inspection apparatus may inspect a wafer, a nanoimprint, blanks in an EVU mask, or a glass substrate before the formation of a pattern thereon.

The present invention is not completely limited to the embodiments described above, and modifications of components can be made at the stage of carrying out the invention without departing from the spirit thereof. Further, various inventions can be made by properly combining the components disclosed in the embodiments described above. For example, some of all the components shown in the embodiments may be eliminated. Moreover, components in different embodiments may be suitably combined together.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A defect inspection apparatus comprising:

an illumination optical system which illuminates a subject;

an image formation optical system comprising an optical path dividing mechanism which divides light originating from the illumination optical system that has passed through or has been reflected by the subject into a plurality of light beams, each of the light beams corresponding to the same optical image of the subject, directs the light beams along respective optical paths, and forms respective optical images from the light beams passing through the respective plurality of optical paths;

an image data conversion unit which converts, to respective sets of image data each set corresponding to the optical image of the subject, each of the optical images derived from the light beams passing through the plurality of optical paths;

a singular part detecting circuit which detects a singular part relative to its periphery in each of the sets of image data;

an optical path length adjusting mechanism which equalizes optical path lengths up to an imaging surface of the image data conversion unit of at least two of the plurality of optical paths, and makes an optical path length of at least one of the plurality of optical paths different from the optical path lengths of the other optical paths; and a defect determiner which determines, as a result of detection by the singular part detecting circuit, that a defect is formed when a singular part is detected in all items of the image data obtained by the light beams passing through the plurality of optical paths equal in optical path length up to the imaging surface, or when a singular part is detected in at least one item of the image data obtained by the light beams passing through the optical paths different in optical path length from the other optical paths.

* * * * *